July 25, 1950

A. LUDWIG 2,516,780

TRAINER FOR ENABLING THE GIVING
OF RADIO INSTRUCTION

Filed Dec. 9, 1944

INVENTOR
A. LUDWIG
BY
P. C. Smith
ATTORNEY

INVENTOR
A. LUDWIG
BY P. C. Smith
ATTORNEY

FIG. 3

INVENTOR
A. LUDWIG
BY
P. C. Smith
ATTORNEY

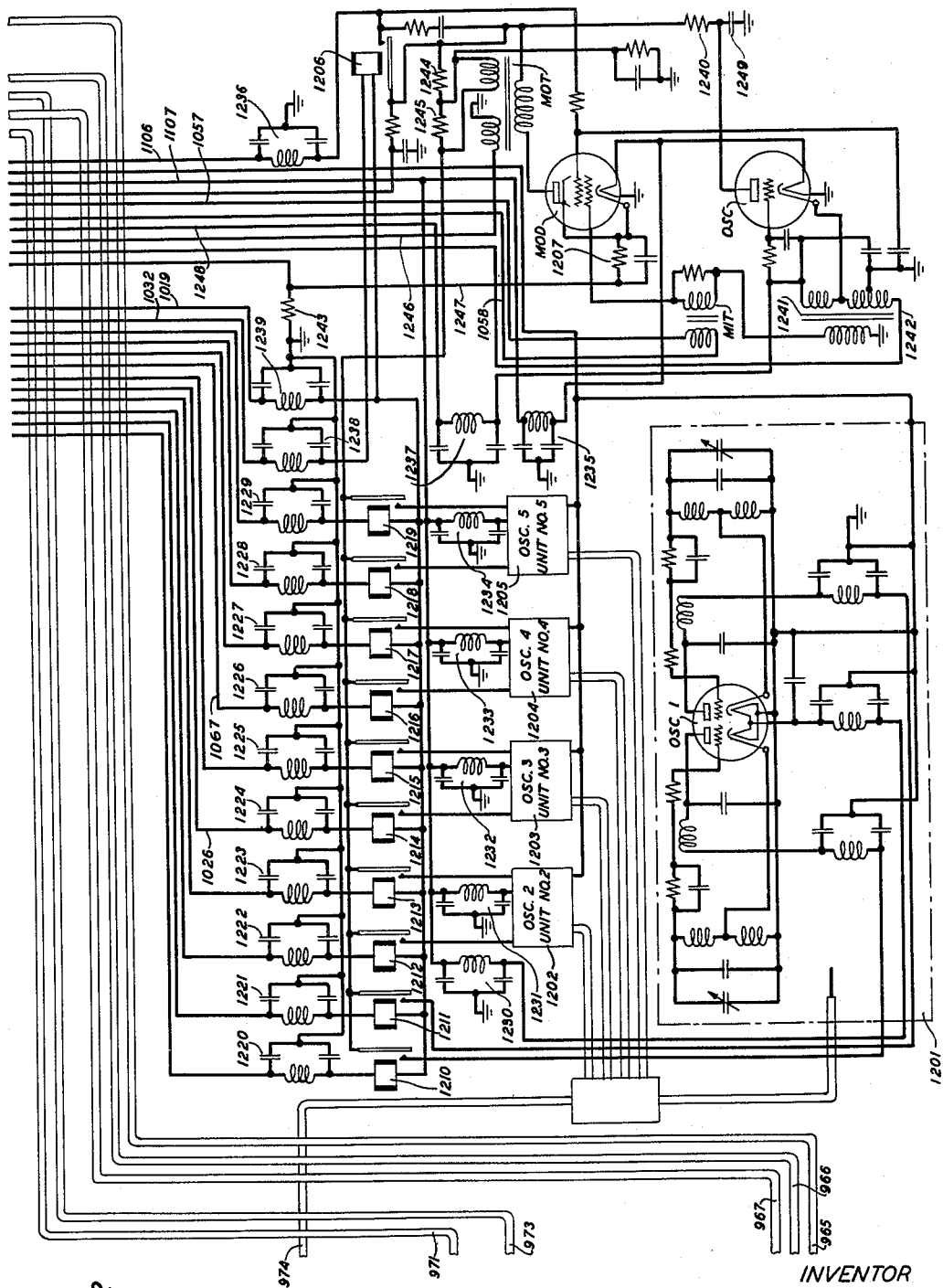

Patented July 25, 1950

2,516,780

UNITED STATES PATENT OFFICE 2,516,780

TRAINER FOR ENABLING THE GIVING OF RADIO INSTRUCTION

Arthur Ludwig, Rockville Centre, N. Y., assignor to Bell Telephone Laboratories, Incorporated, New York, N. Y., a corporation of New York Application December 9, 1944, Serial No. 567,445

27 Claims. (Cl. 35—14)

This invention relates to a radio transmitter and more particularly to the modification of a transmitter whereby it may be used in the training of radiomen in the proper tuning and use of a similar transmitter normally used for regular radio transmission.

There are many instances where radio transmitter and receiving equipments are very important adjuncts to commercial, maritime and war activities and where therefore it is essential that radiomen be trained to handle them efficiently under all operating conditions. One such instance, for example, is on airplanes. Modern airplanes, and particularly those of larger size requiring a crew of several men for their operation used in combat service, are equipped with one or more radio receivers which may be tuned to receive intra-squadron messages or messages from distant bases, with one or more radio transmitters which may be tuned to transmit messages to other airplanes in the same squadron or group or to more distant bases and with an interphone system to enable the members of the crew to converse with each other.

For training an airplane crew to handle the communication equipment of the airplane and to best coordinate their efforts through the use of such equipment, it is proposed to provide radio instruction equipment. This equipment may or may not be corollary to a trainer for giving the airplane crew flight training. However, if a flight trainer is provided for the purpose of giving instruction in the flight operation of an airplane which the trainer is designed to simulate, it is desirable that provision also be made in such trainer for giving the crew training in the use of the communication equipment which would be installed in the airplane.

To enable training to be given in the use of the communication equipment of an airplane in connection with a flight trainer, as illustrated herein, the communication equipment which would be installed as the regular equipment of an airplane of the type which the trainer is designed to simulate is installed in the trainer and an instructor's desk, which is separate from the flight instructor's desk and may for convenience be termed a radio instructor's desk, is provided. The radio instructor's desk is equipped with radio receivers which are capable of being tuned to receive signals from any of the radio transmitters of the trainer, with radio transmitters of the type which would be installed in airplanes for transmission to other airplanes, with a radio transmitter for simulating a transmitter which would be installed at a base of operations for transmission to airplanes and with monitoring equipment to enable the instructor to monitor on communications carried on over the interphone system of the trainer as though he were a member of the crew, to monitor on the operation of the radio receivers and transmitters of the trainer and to monitor on other operations of the communication equipment of the trainer as may be desired.

The present invention is more particularly concerned with the modification of a radio transmitter of the type used in an airplane for long range communication with distant bases, but to enable the better visualization of the manner in which the transmitter is coordinated with the other portion of the communication system and with the radio instructor's desk, the other portions of the communication system and the radio instructor's desk equipment are either shown in detail or schematically herein.

Since it is not desirable for training purposes to radiate power from the transmitter into the ether, the transmitter is not connectable to radiating antenna systems but the oscillator equipment which is arranged to transmit on any one of a plurality of carrier frequencies is carefully shielded and probes are provided within the shield, which probes are connected by a coaxial system with the instructor's desk which system is connected to the inputs of the radio receivers at such desk. Since little power is required for transmission over the short coaxial cable to the instructor's desk, the power amplifier equipment of the transmitter is eliminated and potentiometers operable from the regular tuning controls of the tranmsmitter and electronic devices are provided for controlling the various meters of the transmitter in simulation of their usual response to the tuning of the transmitter. All of the operating and tuning controls are retained although they do not perform their usual functions so that the transmitter panels present their normal appearance and all controls on such panels have the usual feel to the operator and must be operated in the usual manner to produce readings on the meters indicative of the efficiency at which the transmitter is being operated.

The oscillator equipment of the transmitter has been retained and is substantially the same as ordinarily used. In the type of transmitter hereing illustrated two transmitter units are provided one for high frequency range transmission and the other for intermediate frequency transmission and each unit is provided with its own master oscillator equipment. As previously stated, this equipment is shielded to prevent direct radiation. In addition filter circuits are also provided in the power supply leads extending to each oscillator to prevent radiation therefrom and each oscillator is also provided with a potentiometer and range selector switch for use in the simulated control of the meters and suitably connected with the frequency tuning and range selection controls of the oscillator.

For a clearer understanding of the invention and the mode of its operation, reference may be had to the following detailed description when read in connection with the accompanying drawings in which:

Fig. 1 schematically discloses a flight trainer simulating the fuselage of an airplane, a flight instructor's desk, a radio instructor's desk, the control bays in which control apparatus of the trainer is installed, and operating and communication cables interconnecting the trainer, the control bays and the instructors' desks;

Figs. 2 and 3 taken together show the interphone system of the trainer;

Fig. 4 shows schematically the four radio receivers of the trainer, the remote control box for controlling two of such receivers, two of the short range radio transmitters of the trainer, the dynamotor and modulator units, the remote control box and the antenna relay unit therefor, the frequency meter for use in preliminarily tuning the transmitters, junction boxes and conductor and coaxial cables for interconnecting the various apparatus units of the trainer;

Figs. 5 and 6 taken together show the apparatus and circuits mounted in the cabinet and on the panel of the high frequency unit of the modified long range transmitter, Fig. 5 showing the potentiometers and electronic devices responsive to the operation of the tuning controls of the usual amplifier stages of the transmitter, and Fig. 6 showing in the lower portion thereof and enclosed within the dot-dash lines, the modified oscillator equipment and in the remaining portion thereof additional potentiometers and switch equipment responsive to the operation of other tuning controls of the transmitter, and meters;

Fig. 7 shows the apparatus mounted in the cabinet and on the panel of the central or power unit of the transmitter, meters, control switches and jacks being shown in the upper portion of the figure, the rectifier equipment being shown in the right lower portion of the figure, and the modulator circuit for use in both the high and intermediate frequency units of the transmitter and additional controls being shown in the lower left portion of the figure;

Fig. 8 shows the apparatus and circuits mounted in the cabinet and on the panel of the intermediate frequency unit of the transmitter, the modified oscillator equipment being shown in the dot-dash rectangles in the lower portion of the figure and the potentiometers, switches and electronic devices responsive to the usual controls of the transmitter, and meters being shown in the remaining portion of the figure;

Fig. 9 shows schematically the four radio receivers at the instructor's desk, the control turret on the desk, the front and cross-section of which have been illustrated, junction boxes and conductor and coaxial cables for interconnecting the various apparatus units at the instructor's desk;

Fig. 10 shows in the lower left portion thereof the communication equipment located at the flight instructor's desk whereby the flight instructor may communicate with the members of the crew in the trainer over the interphone system, in the lower central portion thereof, the receivers, transmitter and signal key and the connection plugs and jacks located at the radio instructor's desk and in the remaining portion of the figure the equipment located in the turret on the desk;

Fig. 12 shows in the lower right portion thereof the transmitter modulator and in the remaining portion thereof the transmitter oscillator units and the selection relays associated therewith located within the radio instructor's desk; and Fig. 13 is a diagram showing how the other figures of the drawing should be arranged to completely disclose the invention.

Figure 1:
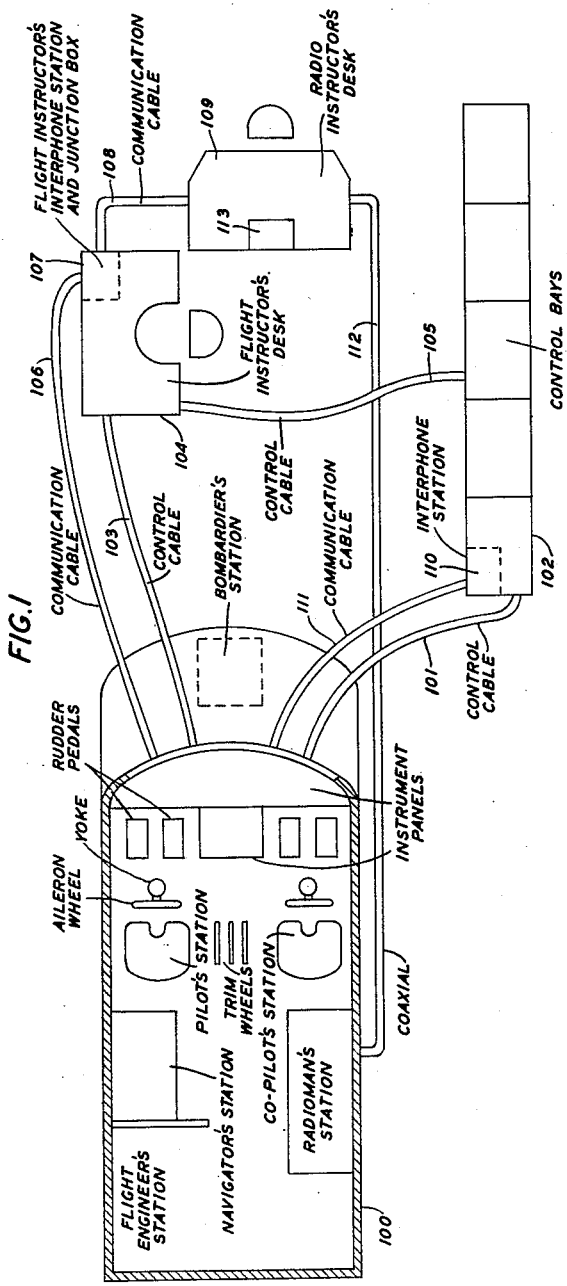

Referring first to Fig. 1, a mock-up of the fuselage of an airplane is identified by the numeral 100, in which fuselage the various stations of the members of the crew are indicated, these stations comprising the pilot's, co-pilot's, flight engineer's, navigator's, bombardier's and radioman's station, all interconnectable over the usual interphone system as will later be described. The operational and flight control equipment of the trainer is connected over control cable 101 with the control bays 102 and over control cable 103 with the flight instructor's desk 104 which in turn is connected over control cable 105 with the control bays 102. The trainer mock-up 100 is also connected by a communication cable 106 with a distributing box at the flight engineer's desk 104 from which box a cable of conductors extends to the flight instructor's interphone station 107 and from which a connection over communication cable 108 is extended to the radio instructor's desk 109. A station 110 at the control bays is also connected over communication cable 111 with the interphone system of the trainer, whereby communication with members of the crew and with the instructors may be carried on by the maintenance man at the control bays. The radio receivers and transmitters in the trainer are also connected with the radio receivers and transmitters at the radio instructor's desk by a coaxial cable 112.

Figure 2:
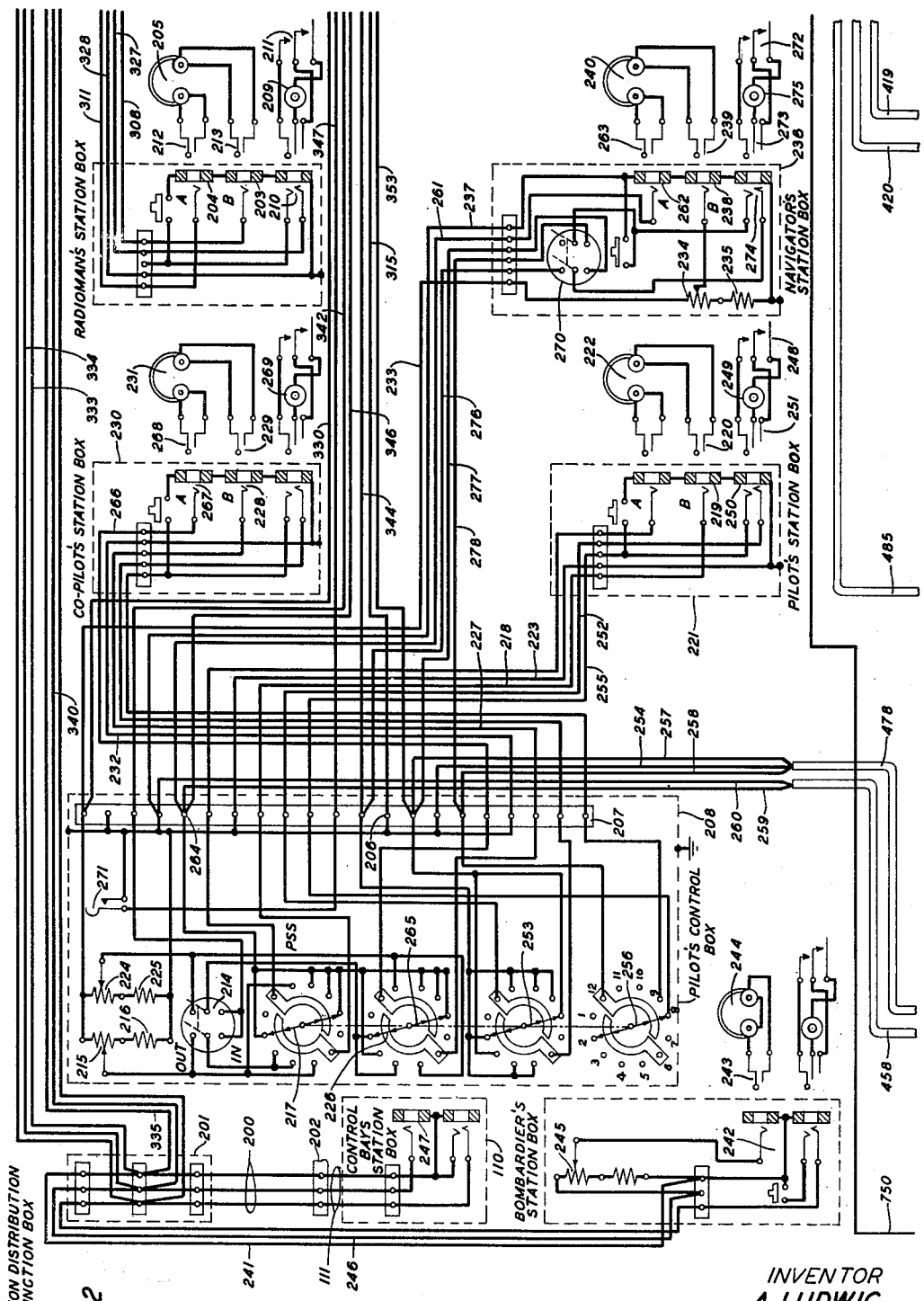
Figure 3:
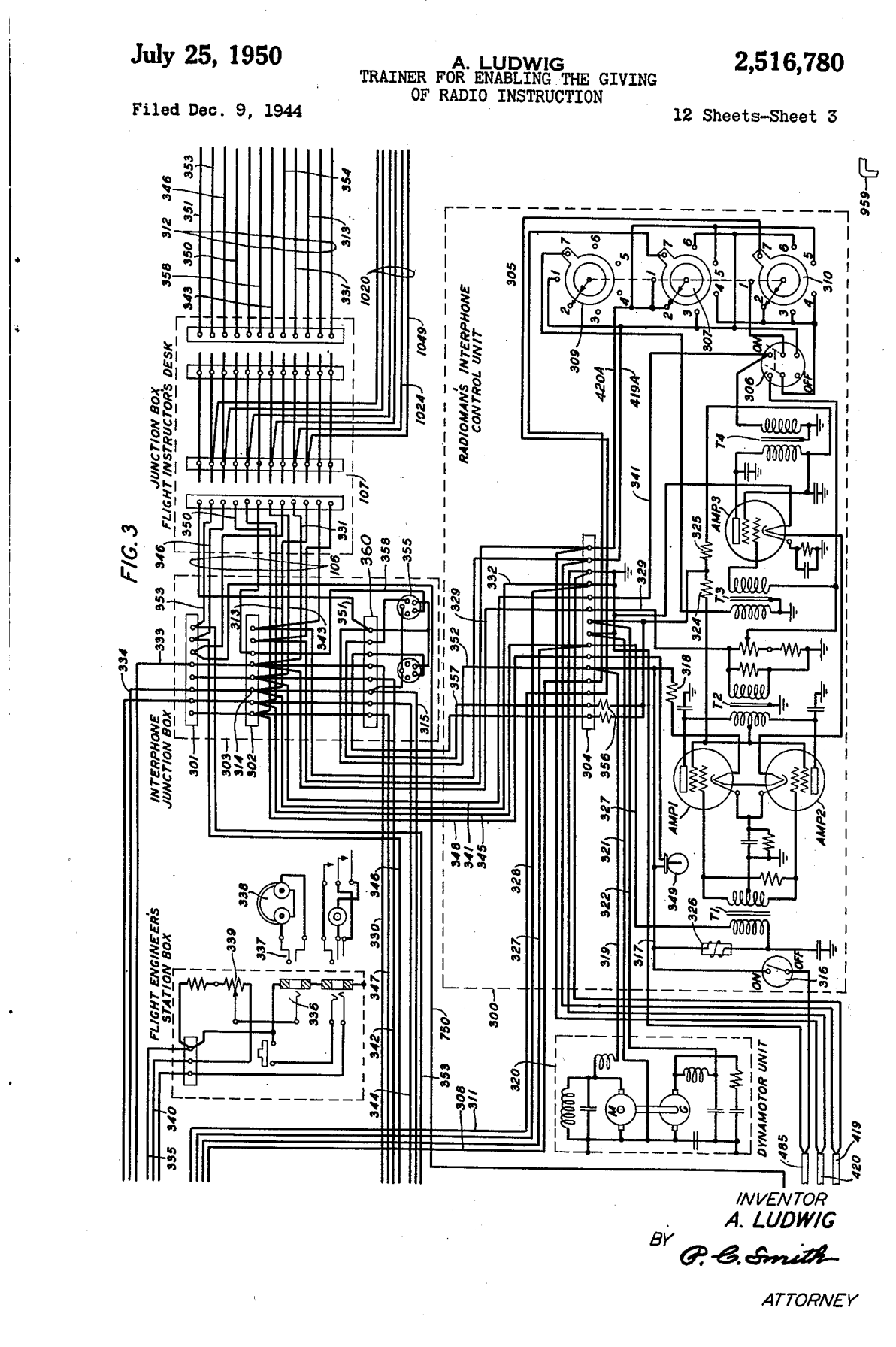

The interphone system of the trainer, disclosed in Figs. 2 and 3, is substantially identical with that installed in an airplane of the type in which the trainer is designed to simulate but has been modified by the addition of cable 200 which extends from the distribution junction box 201 to the terminal strip 202 on the pilot's panel from which the cable 111 extends to the interphone station 110 at the control bays 102. Terminals have also been added to the terminal strips 301 and 302 in the interphone junction box 303 and a cable of conductors 106 has been extended from terminals on the strips 301, 302 and 360 to the junction box 107 at the flight instructor's desk 104.

Figure 4:
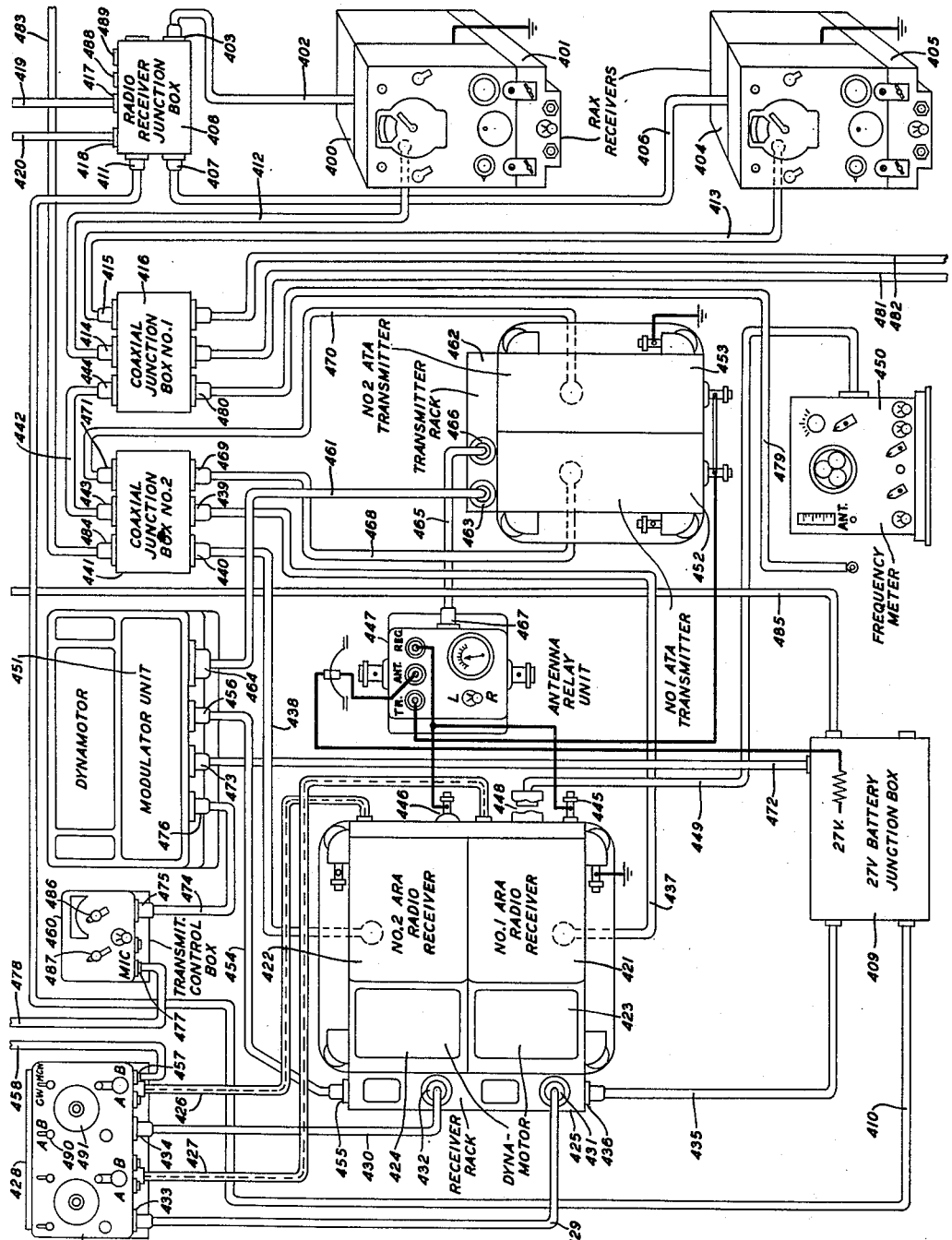

As schematically disclosed in Fig. 4, two radio receivers 400 and 404 are mounted on the receiver racks 401 and 405 which in turn are mounted in the trainer 100 on a rack above the radioman's station and are connected by cables 402 and 406 and plug and jack connectors 403 and 407 with the radio receiver junction box 408 located adjacent to the receivers. 27-volt direct current is supplied to these receivers from the battery junction box 409 over the cable 410 which makes connection with the junction box 408 over the plug and jack connector 411. The inputs of these receivers are not connected in the usual manner with an antenna system but instead probes are inserted within the receiver casings and connected over coaxial cables 412 and 413 and the plug and jack connectors 414 and 415 with the coaxial junction box 416 located under the radioman's table. The radio receiver junction box 408 is provided with jacks 417 and 418 in which plug-ended cables 419 and 420 extending to terminals on the terminal strip 304 of the radioman's interphone control unit 300, Fig. 3, are inserted.

The output of the No. 1 receiver 400 is received over cable 420 and, with the selector switch 305 in position 1 and the switch 306 in either the on or off position this output is connected over the No. 1 contact of the switch arc 307, conductor 308, and the plug and jack connector 203 at the radioman's station box, with the right receiver of the radioman's headset 205, and the output of the No. 2 receiver 404 is received over cable 419 and, with the selector switch 305 in position 1 and the switch 306 in its interphone system-on position, this output is connected over the No. 1 contact of the switch arc 309 to the primary winding of transformer T3, is impressed upon the amplifier tube AMP3, amplified thereby and impressed through the windings of output transformer T4, over the upper right contact of switch 306 and the No. 1 contact of switch arc 310, over conductor 311 and the plug and jack connector 204 at the radioman's station box with the left receiver of his headset 205, or if switch 306 is in its interphone system-off position this output is applied over the lower right contact of switch 306 and the No. 1 contact of the switch arc 310 and thence as traced to the left receiver of the radioman's headset 205.

If the selector switch 305 is in position 2, the No. 1 radio receiver is connected to the radioman's right headset receiver as previously described and reception from the interphone system is applied from the secondary winding of transformer T2, over the upper left contact of switch 306 if it is in its interphone-on position, over the No. 2 contact of switch arc 310 and thence as traced to the left receiver of the radioman's headset 205. If the selector switch 305 is in position 3, the No. 2 receiver is connected over the No. 3 contact of the arc 307 with the right receiver of the headset 205 in either position of switch 306 and with the switch 306 in its on position reception from the interphone system is applied from the secondary winding of transformer T2, over the upper left contact of switch 306 and the No. 3 contact of arc 310 to the left receiver of the radioman's headset 205. If the switch 305 is in position 4 and the switch 306 is in its on position, reception from the interphone system is applied over the upper left contact of switch 306 and the No. 4 contacts of arcs 307 and 310 to both receivers of the radioman's headset 205. If the switch 305 is in position 5, the No. 1 receiver 400 is connected over the No. 5 contacts of arcs 307 and 310 with both receivers of the headset 205 and if the switch 305 is in position 6 the No. 2 receiver 404 is connected over the No. 6 contacts of arcs 307 and 310 with both receivers of the headset 205. The switch 305 may thus be selectively operated by the radioman so that he may, over his two headset receivers, simultaneously listen in on both radio receivers 400 and 404 or on either radio receiver and the interphone system, and may listen in with both headset receivers on either the interphone system, the No. 1 radio receiver 400 or the No. 2 radio receiver 404.

Two other radio receivers 421 and 422 are equipped with receiver dynamotor units 423 and 424 which supply them with high positive anode potential and are mounted in a two-unit receiver rack 425 in turn mounted on a shelf above the flight engineer's station. These receivers may be operated singly or together by local tuning controls or may be remotely controlled over flexible control cables 426 and 427 from the receiver control box 428. The receivers are also connected by the cables 429 and 430 which connect by plug and jack connectors 431 and 432 with the receiver rack 425 and by plug and jack connectors 433 and 434 with the control box 428. Battery current from the 27-volt battery junction box 409 is supplied to these receivers over the cable 435 which is connected with the receiver rack 425 by a plug and jack connector 436.

The inputs of the radio receivers 421 and 422 are not connected in the usual manner with an antenna system but instead probes are inserted within the receiver casings and connected over coaxial cables 437 and 438 and the plug and jack connectors 439 and 440 with the coaxial junction box 441 located adjacent to the receivers 421 and 422. This junction box is connected over the coaxial cable 442 with the coaxial junction box 416. The cable 442 makes connection with the two junction boxes by the plug and jack connectors 443 and 444.

The antenna binding posts 445 and 446 of the receivers 421 and 422 are connected to the receiver binding post REC of the antenna relay unit 447 by cloth sleeving to simulate the usual connection of the receivers to the antenna relay unit. The use of wire for these connections would result in undesired radiation. When the frequency meter 450 is to be used in checking the frequency of the output of radio transmitters 452 and 453 of the trainer it receives power for its operation over the cord 449 connected by the plug 448 with supply leads in the radio receiver 421. To control the relays of the receiver rack 425 to cut off the receivers when either transmitter 452 or 453 is being used, to supply operating ground from the relay rack 425 to the modulator unit 451 and to supply side-tone reception to the radio receivers 421 and 422 whenever either of the transmitters 452 and 453 is being used, the receivers are connected over the receiver rack 425 and the cable 454 with the modulator unit 451, the cable making connection with the receiver rack 425 by the plug and jack connector 455 and with the modulator unit by the plug and jack connector 456.

The outputs of receivers 421 and 422 are connected over conductors of cables 429 and 430 to the receiver control box 428 aand may be connected to the pilot's control box of the interphone system, shown in Fig. 2, by the insertion of the plug 457 of the cord 458 into either the A or B jacks of either section of the receiver control box 428.

Two transmitters 452 and 453 are provided in the trainer for short distance transmission between airplanes of the same squadron or group.

These transmitters are mounted on a shelf above the flight engineer's instrument panels and the transmitter control box 460 for remotely controlling such transmitters is mounted on the pilot's pedestal. The modulator unit 451 for these transmitters is mounted to the right of the transmitters and the antenna relay unit 447 is mounted above the transmitters. A cable 461 connects the rack 462 upon which the transmitters are mounted with the modulator unit 451, such cable being connected to the rack and to the modulator unit by plug and jack connectors 463 and 464. Cable 465 connects the transmitter rack 462 with the antenna relay unit 447, such cable being connected to the rack and to the antenna relay unit by plug and jack connectors 466 and 467.

The antennas of the transmitters are not used for radiating energy but instead each transmitter is provided with a probe within its casing, the probe of transmitter 452 being connected to a coaxial cable 468 which is connected by the plug and jack connector 469 with the coaxial junction box 441 and the probe of transmitter 453 being connected to a coaxial cable 470 which is connected by the plug and jack connector 471 with the coaxial junction box 441. Power for operating the transmitters is supplied from the battery junction box 409 over cable 472 which connects with the modulator unit 451 by the plug and jack connector 473. The transmitters are remotely controlled from the control box 460 over the cable 474 which is connected by a plug and jack connector 475 with the control box and by a plug and jack connector 476 with the modulator unit 451. The microphones of certain of the interphone station boxes are connectable to the modulator unit 451 over the cable 474 by the insertion of the plug 477 of the cord circuit 478 extending to the pilot's control box, Fig. 2, into the microphone jack MIC of the control box 460. The antenna binding posts of the transmitter are connected as shown to the TR binding post of the antenna relay unit 447 and the ANT binding post of the antenna relay unit is connected to the 27-volt supply in the battery junction box 409.

The antenna relay unit 447, the transmitter rack 462, one of the transmitters mounted thereon, for example transmitter 452, the modulator unit 451 together with the associated dynamotor unit and as modified for use as a trainer, are all fully disclosed in the Patent No. 2,458,550 granted January 11, 1949, to E. L. Baulch.

Figure 5:
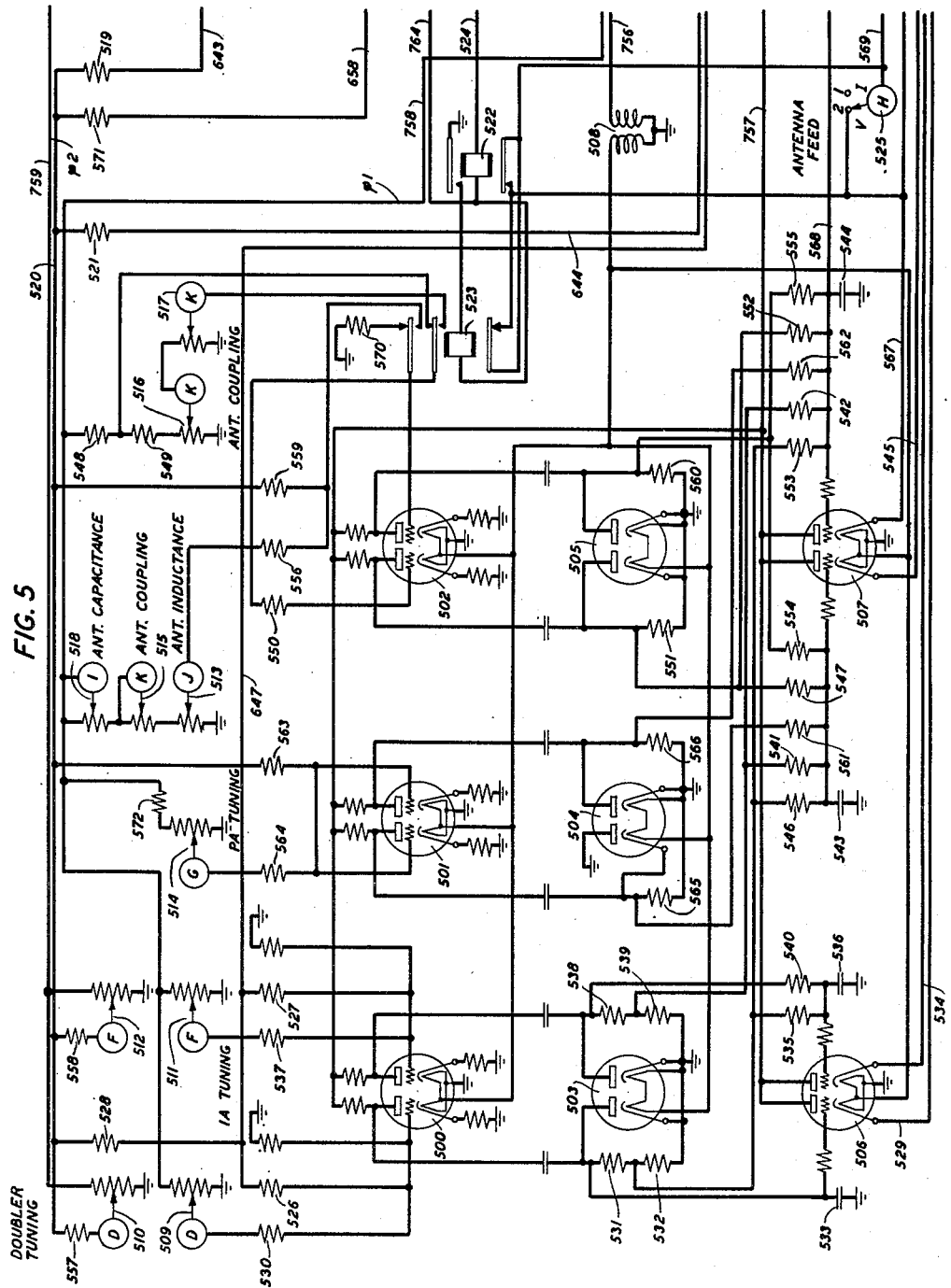
Figure 6:
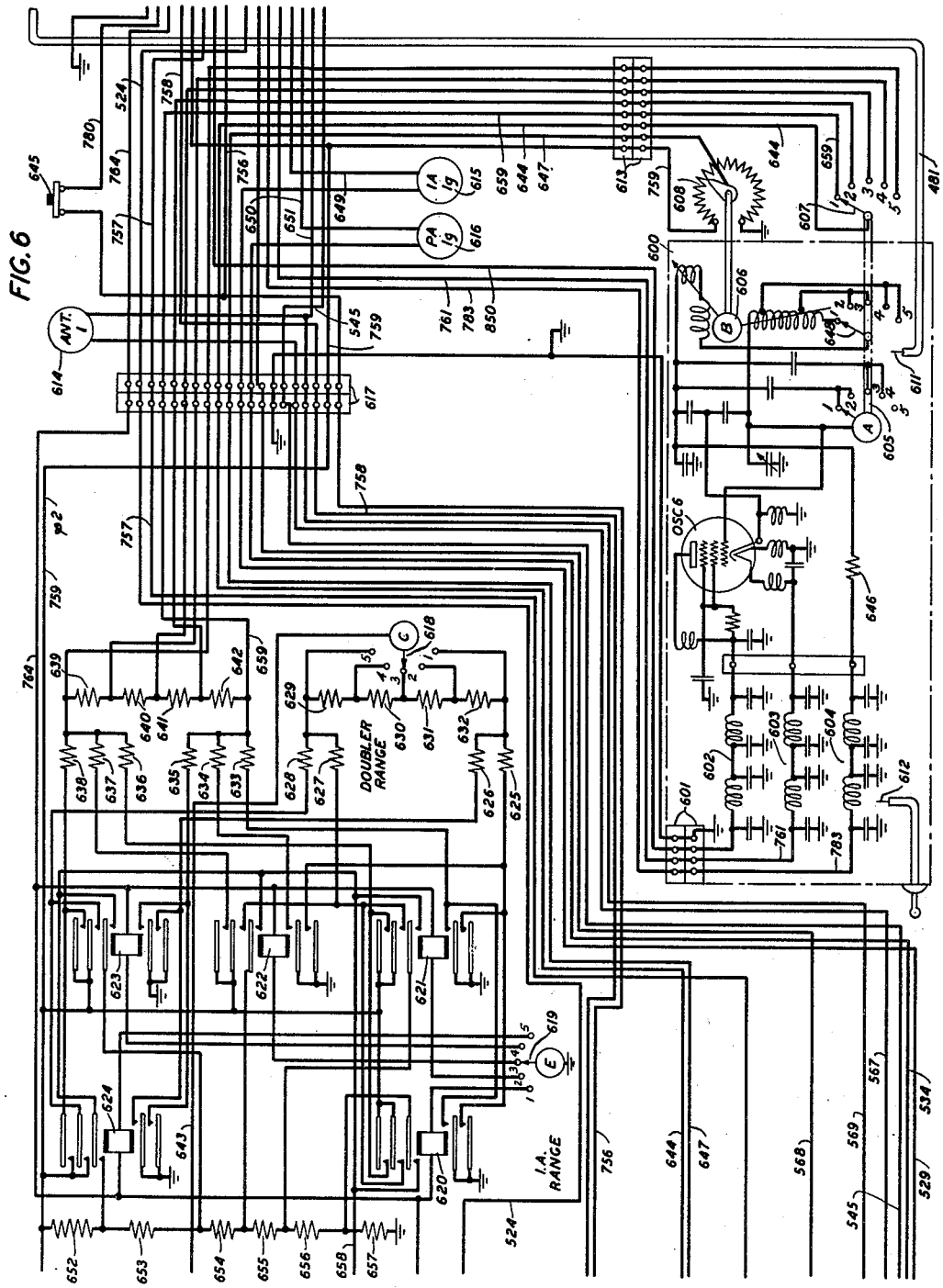
Figure 7:
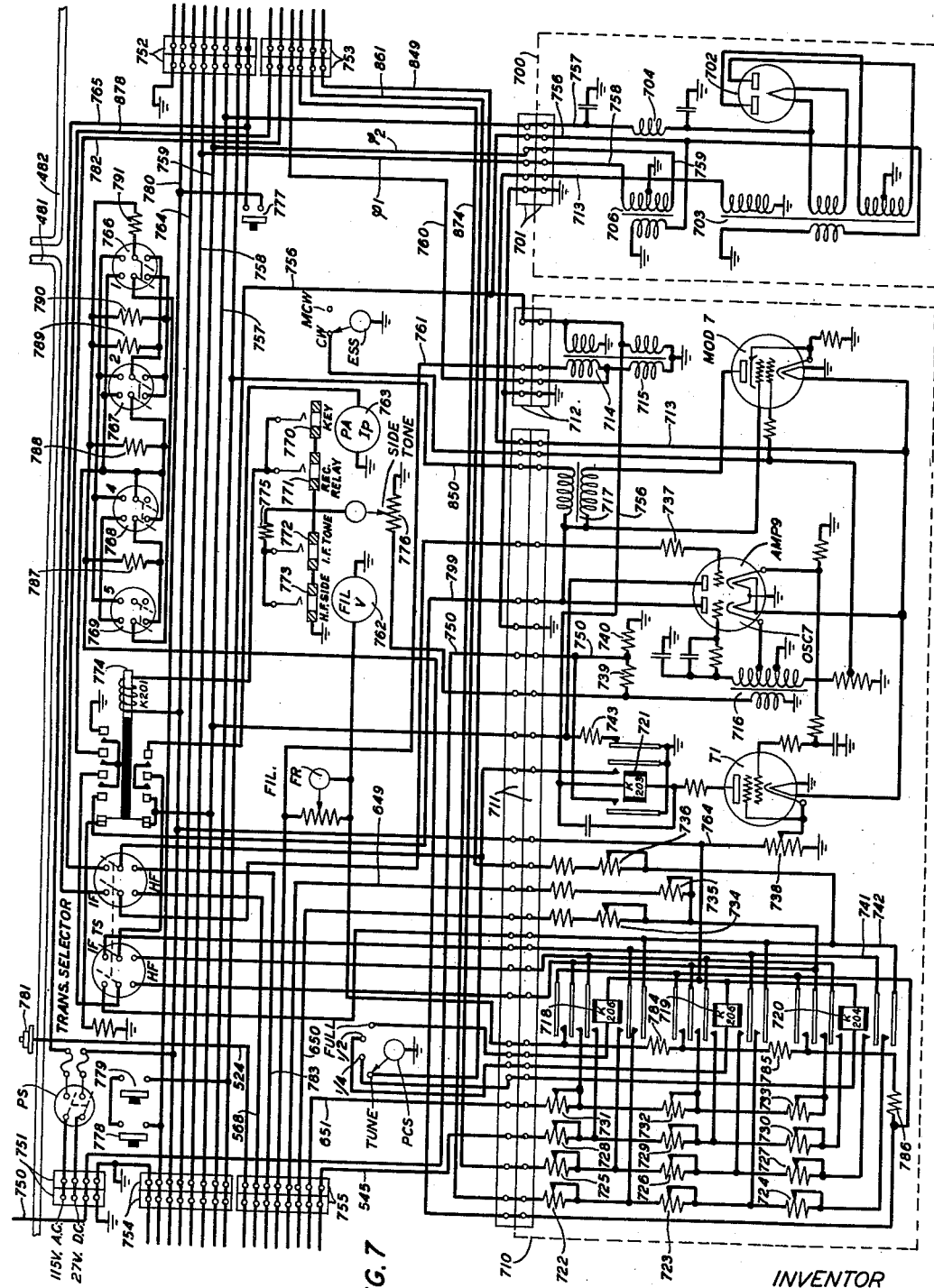
Figure 8:
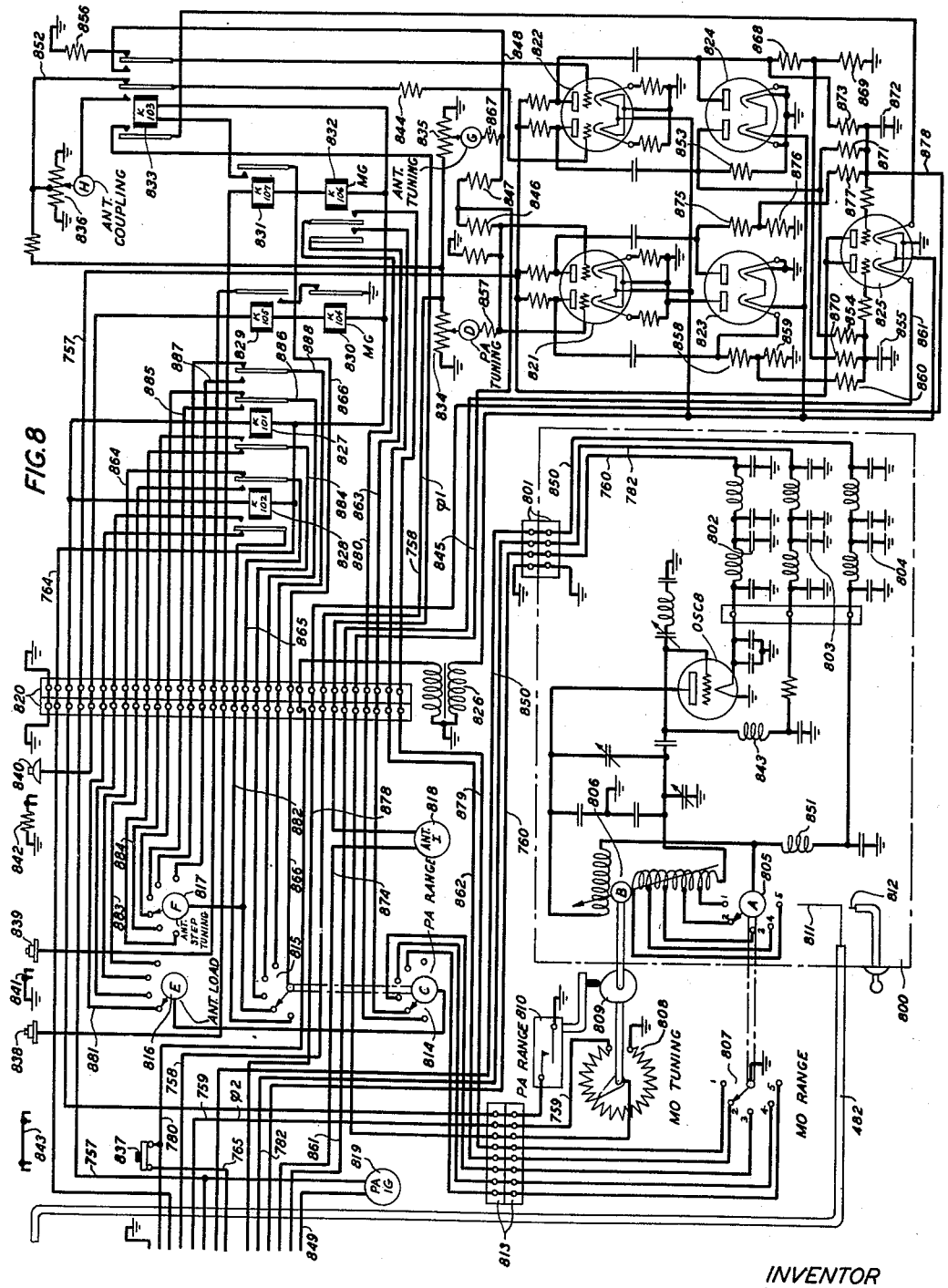

The antenna terminal of frequency meter 450 is connectable by a coaxial cable 479 with the coaxial cable junction box 416 and then through cable 442 with the coaxial junction box 441 which is located under the radioman's table or with the frequency checking terminals of the transmitter units of Figs. 6 and 8. From the junction box 416 coaxial cables 481 and 482 extend to the oscillator unit 600 of the high freqency section and to the oscillator unit 800 of the intermediate frequency section of the long range transmitter disclosed in Figs. 5 to 8, inclusive, where they terminate in probes enclosed within the casings of the oscillator units. The long range transmitter will be described in more detail hereinafter. A coaxial cable 483 extends from the coaxial junction box 441 where it is connected by the plug and jack connector 484, to the coaxial junction box 900 in the instructor's desk to which it makes connection by the plug and jack connector 901.

Figure 9:
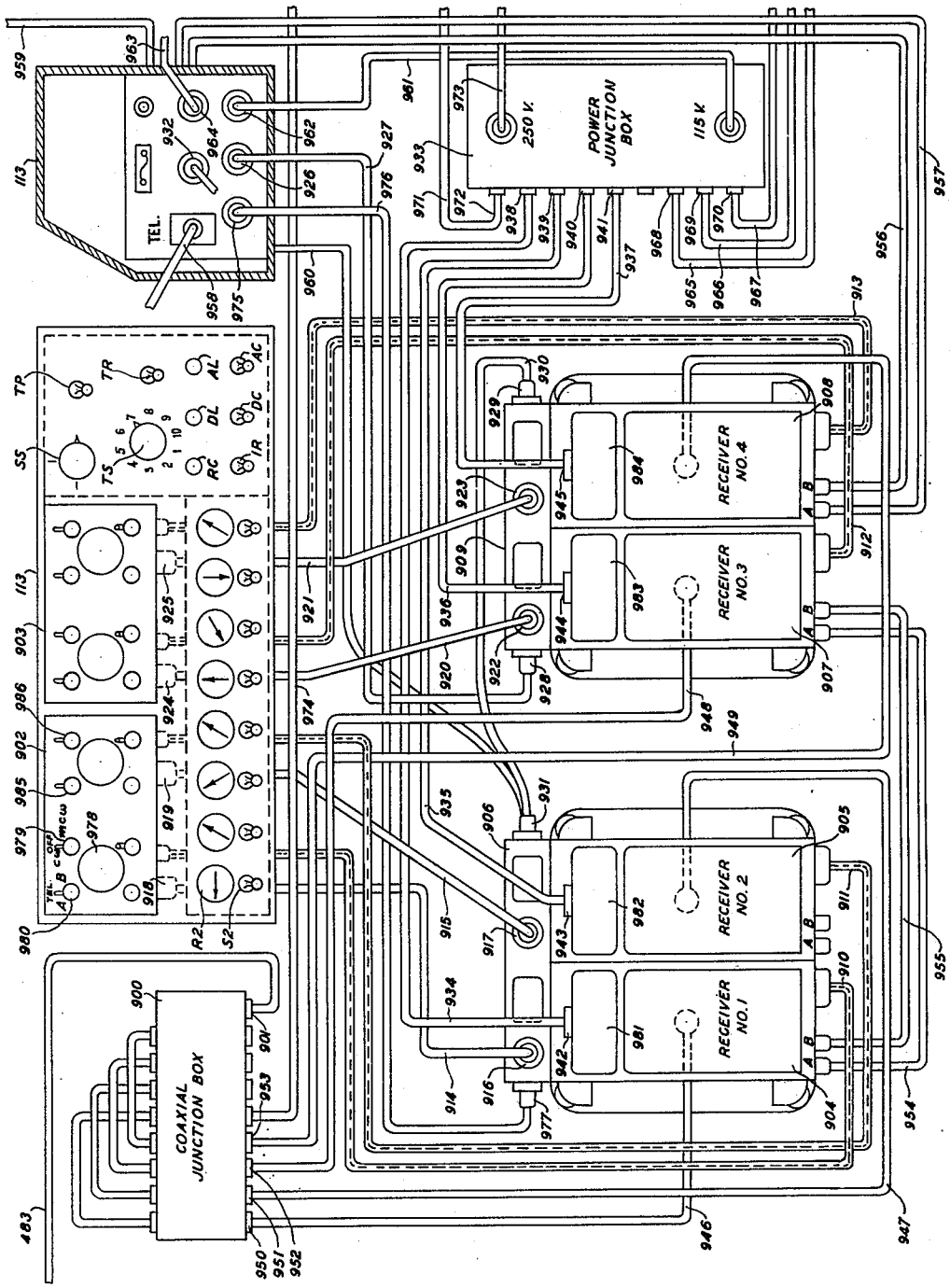

The instructor's desk is provided with a control turret 113 mounted on the top surface thereof as schematically indicated in Fig. 1. For better illustrating the cabling from this turret to the apparatus units housed within the desk 109 the turret is shown both in front and sectional views in Fig. 9. This turret is provided with two receiver control boxes 902 and 903, a signal selector switch SS, a transmitter frequency selection switch TS, a transmitter power control switch TP and a switch TR for controlling the transfer of the desk circuits from a receiving to a transmitting condition, all mounted in the sloping portion of the front wall of the turret. A plurality of switches such as S2 and rheostats such as R2 appertaining to eight monitoring circuits, a switch IR for determining whether the microphone at the desk shall be connected for operation with the interphone system or with the radio equipment, a switch DC for connecting a 27-volt direct current source to the desk and a lamp DL shown immediately above it to indicate when the direct current is connected, a switch AC for connecting a 115-volt source of alternating current to the desk and an indicating lamp AL located immediately above it to indicate when the alternating current is thus connected, and a recall lamp RC are all mounted on the vertical portion of the front wall of the turret. These controls are best illustrated in the circuit diagram of Fig. 10.

Four receivers are mounted in the desk. The Nos. 1 and 2, 904 and 905, are mounted on a receiver rack 906 which is in turn mounted on a frame located in the rear central portion of the desk. The Nos. 3 and 4 receivers, 907 and 908, are similarly mounted on a receiver rack 909 which is also mounted on the same frame in the desk. All of these receivers may be either locally or remotely controlled. The receivers 904 and 905 may be remotely controlled over the flexible control cables 910 and 911 which extend from the receivers to the control box 902 and the receivers 907 and 908 may be remotely controlled over the flexible cables 912 and 913 which extend from such receivers to the control box 903.

Receivers 904 and 905 are connected by cables 914 and 915 with the control box 902, these cables making connection with the receiver rack 906 by the plug and jack connectors 916 and 917 and with the control box by the plug and jack connectors 918 and 919. Receivers 907 and 908 are similarly connected by cables 920 and 921 with the control box 903, these cables making connection with the receiver rack 909 by the plug and jack connectors 922 and 923 and with the control box 903 by the plug and jack connectors 924 and 925. Direct current of 27 volts is supplied to these receivers from the turret over the plug and jack connector 926, cable 927 and the plug and jack connector 928 to the receiver rack 909, and over the plug and jack connector 975, cable 976, and the plug and jack connector 977 to the receiver rack 906 whereby direct current is supplied to the Nos. 3 and 4 receivers 907 and 908 from rack 909 and whereby direct current is supplied to the Nos. 1 and 2 receivers 904 and 905 from rack 906. The direct current is supplied to the turret over the plug 932 and as previously described is connectable to the circuits of the instructor's desk including the circuits extending over cables 976 and 927, under the control of switch DC as best disclosed in Fig. 10. 250-volt operating current is supplied to high voltage relay units 981, 982, 983 and 984 of the receivers from the power junction box 933 mounted in the left end of the desk over the power supply cables 934, 935, 936 and 937 which are connected by plug and jack connectors 938, 939, 940 and 941 with the junction box 933 and by plug and jack connectors 942, 943, 944 and 945 with the receivers 904, 905, 907 and 908 respectively. These relay units are used at the desk instead of the usual dynamotor units in order that the operation of the desk may be quieter. Each unit comprises a relay operable by 27-volt direct current when the receiver to which it is allocated is turned on to connect 250-volt direct current to the plates of the tubes of the receiver.

The inputs of the radio receivers are not connected in the usual manner with an antenna system, but instead probes are installed within the receiver casings and connected over coaxial cables 946, 947, 948 and 949 with the coaxial junction box 900 with which such cables make connection by the plug and jack connectors 950, 951, 952 and 953. The outputs of the receivers 904 and 905 are interconnected to A and B telephone jacks and such jacks are connected by plug-ended cords 954 and 955 with the interconnected A and B telephone jacks of the receivers 907 and 908 and the latter jacks are further connected by plug-ended cords 956 and 957 to a terminal strip in the turret 113 from which they are connected over the cable 959 with the A and B receiver jacks shown in Fig. 10 and mounted in the well of the desk 109.

The receiver racks 906 and 909 are interconnected by the cable 930 and are also connected to controls in the turret 113 over cable 960 which is plug and jack connected with the receiver rack 906 and is connected to the turret.

115-volt alternating current is supplied to the power junction box 933 over cable 961 which is connected to the turret 113 over the plug and jack connector 962. 115-volt alternating current is supplied to the turret under the control of switch AC over cable 963 connected to the turret over the plug and jack connector 964. From the power junction box 933, 115-volt alternating current is supplied over cables 965, 966 and 967, which are connected to the junction box by plug and jack connectors 968, 969 and 970, to the 250-volt rectifier unit 1100, to the regulated 220 to 350-volt rectifier unit 1110 and to the monitoring amplifier unit 1150 of Fig. 11. Also from the power junction box 250-volt direct current is supplied over cable 971, which is connected by the plug and jack connector 972 to the junction box, to the monitoring amplifier unit 1150. 250-volt direct current is also supplied to the junction box over cable 973 from the rectifier unit 1110.

The coaxial junction box 900 is also connected over coaxial cable 974 with the probes of the five oscillator units of the radio transmitter disclosed in Fig. 12, which transmitter is located in the right end portion of the radio instructor's desk 109.

The transmitter equipment in the instructor's desk shown in Fig. 12 consists of a shielded unit mounted on a rack in the desk with the controls mounted in the turret on the desk. The transmitter is connected to the turret by two cables of conductors such cables making connection with the transmitter over the plug and jack connectors 1000 and 1001 as disclosed in Fig. 10. The transmitter consists of five oscillators, one of which 1201 is shown in full and the other four of which are similar but indicated by the boxes labeled 1202 to 1205, inclusive. Each of these oscillators comprises a dual oscillator tube such as OSC—1, one unit of which may be tuned to oscillate at one frequency and the other unit of which may be tuned to oscillate at another frequency. Thus the five oscillator units may be so tuned as to emit ten carrier frequencies covering the frequency ranges emitted by the transmitters of the airplane which the trainer is designed to simulate. The particular oscillator which is to be used for transmission is selected by the operation of the associated power supply relay of which ten 1210 to 1219, inclusive, are provided under the control of the ten point transmitter selector switch TS in the turret. As before stated the oscillators are connected over the coaxial cable 974 and the coaxial junction box 900 with the coaxial system.

The transmitter is also provided with a filter section in which are mounted the filters 1220 to 1229, inclusive, interposed in the control conductors over which the relay 1210 to 1219 are operated, the filters 1230 to 1234, inclusive, in the filament current supply leads to the oscillators, the filter 1235 in the filament current supply lead to the tubes of the modulator, the filter 1236 in the supply lead over which plate potential is supplied to the tubes of the oscillators and modulator, the filter 1237 in the lead which supplies potential to the grid of the oscillator tube OSC of the modulator and the filters 1238 and 1239 in the operating circuit of relay 1206. These filters are provided for the purpose of preventing high frequency radiation from the leads in which they are interposed.

Figure 10:
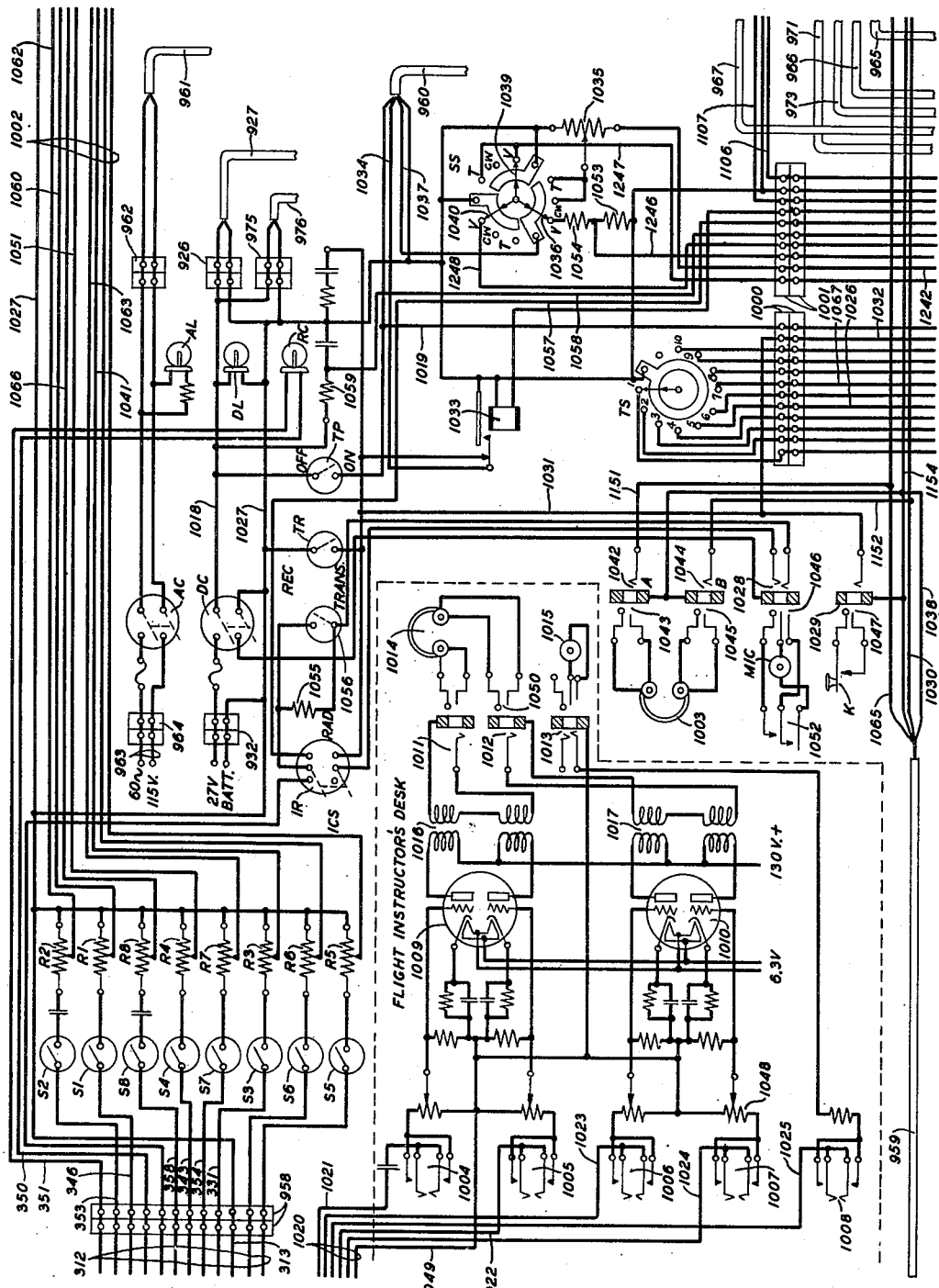

The modulator section of the transmitter consists of a modulator tube MOD which modulates the plate potential applied to the oscillator tube which is selected for transmitting, a microphone transformer MIT which matches the microphone MIC disclosed in Fig. 10 to the modulator tube, and the modulating transformer MOT used in the output circuit of tube MOD. An audio frequency oscillator tube OSC is also provided to supply approximately 800 cycle tone for tone modulated transmission. The transmitter may be operated on CW (continuous wave) or tone or voice amplitude modulation under the control of the selector switch SS in the turret.

Figure 11:
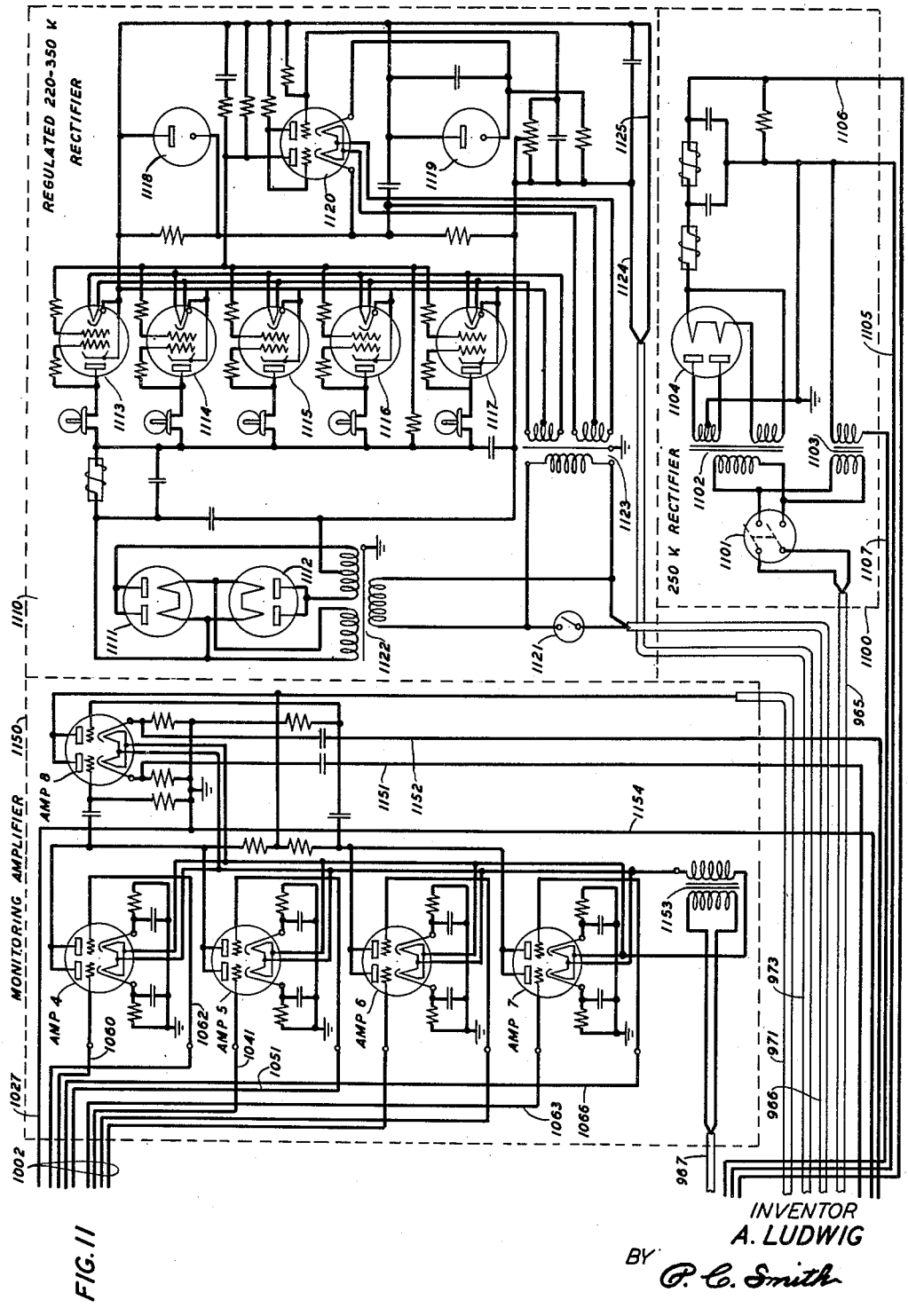
Fig. 11 shows within the rectangle in the left portion thereof the monitoring amplifier equipment, within the rectangle in the upper right portion thereof the regulated rectifier equipment and within the rectangle in the lower right portion thereof the 250-volt rectifier equipment, all located in the radio instructor's desk.

The conductors of cable 312 are extended from the junction box 107 at the flight instructor's desk over terminals of the plug and jack connector 958 to the turret 113 of the radio instructor's desk and certain of these conductors are connected through the contacts of switches S1 to S8, inclusive, and through rheostats R1 and R8, inclusive, in the turret and over conductors of cable 1002 to the monitoring amplifier unit 1150 of Fig. 11. This amplifier unit comprises a first stage having four dual amplifier tubes AMP—4 to AMP—7, inclusive, and a second stage having one dual amplifier tube AMP—8. The outputs of tubes AMP—4 and AMP—5 are applied to the left unit of tube AMP—8 and the output of this unit is applied over conductor 1151 to the A receiver jack 1042 of the desk and the outputs of tubes AMP—6 and AMP—7 are applied to the right unit of tube AMP—8 and the output of this unit is applied over conductor 1152 to the B receiver jack 1044 of the desk. Thus when the instructor's headset 1003 is plugged into the jacks A and B and the proper monitoring switches of the groups S1 to S8 are operated, the radio instructor is able to monitor on certain of the monitoring circuits over his left headset receiver and to monitor on others of the monitoring circuits over his right headset receiver. Plate potential of 250 volts is supplied to the amplifier tubes over cable 971 and 115-volt alternating current supplied over cable 967 is applied to the step-down transformer 1153 to provide 6.3-volt heating current for the filaments of the tubes.

The 250-volt rectifier unit 1100 of Fig. 11 is of the well-known full wave type, 115-volt alternating current being applied thereto over cable 965 through the switch 1101 to the primary windings of transformers 1102 and 1103. Transformer 1102 is a step-up transformer and applies potential to the rectifier tube 1104 which rectifies the alternating current to produce direct current of 250 volts which is applied between the ground conductor 1105 and the 250-volt supply conductor 1106. The transformer 1103 is a step-down transformer for producing filament heating current of 7.5 volts in the circuit including the ground conductor 1105 and heater conductor 1107 for heating the filaments of the tubes of the oscillators and the oscillator and modulator tubes of the modulator shown in Fig. 12.

The 220 to 350-volt regulated rectifier unit 1110 of Fig. 11 is of a well-known type having two rectifier tubes 1111 and 1112 arranged for push-pull operation, five parallelly connected amplifier tubes 1113 to 1117, inclusive, connected in series with the direct current load circuit, two gas-filled tubes 1118 and 1119 bridged across the load circuit and a dual tube 1120, one unit of which is in bridge of the gas-filled tube 1118 and the other unit of which is in bridge of the gas-filled tube 1119. Alternating current from the 115-volt supply source is applied over cable 966 and through switch 1121 to the primary windings of transformers 1122 and 1123. Transformer 1122 is a step-up transformer and applies its output voltage to the diode rectifier tubes 1111 and 1112 whereby a direct current of 350 volts is produced which is amplified by the tubes 1113 to 1117, inclusive, which are in turn regulated by the tubes 1118, 1119 and 1120, and applied between conductors 1124 and 1125 of cable 973. This potential, as previously stated is applied to the plates of the oscillator tubes of Fig. 12 and to the plates of the tubes of the radio receivers 904, 905, 907 and 908 of Fig. 9. Transformer 1123 is a step-down transformer and over its secondary windings supplies filament heating current to the filaments of tubes 1113 to 1117, inclusive, and to the filament of tube 1120.

The apparatus disclosed within the rectangle in Fig. 10 is located at the interphone station 107 of the flight instructor's desk. It comprises five keys 1004 to 1008, inclusive, two dual amplifier tubes 1009 and 1010 and jacks 1011, 1012 and 1013 into which the flight instructor may plug his headset 1014 and microphone 1015. The tubes 1009 and 1010 are supplied with filament heating current and with plate potential from suitable sources. The instructor by operating keys 1004 and 1005 may cause the amplification by tube 1009 of signals incoming over conductors 1021 and 1022 of cable 1020 extending from the junction box 107 of the flight instructor's desk and the application thereof through the windings of output transformer 1016 and over jack 1011 to the left receiver of the headset 1014 and, by operating keys 1006 and 1007 may cause the amplification by tube 1010 of signals incoming over conductors 1023 and 1024 of cable 1020 and the application thereof through the windings of output transformer 1017 and over jack 1012 to the right receiver of the flight instructor's headset 1014. The operation of key 1008 connects the microphone 1015, when plugged into jack 1013, over the contacts of such key to conductor 1025 of cable 1020.

The transmitter of the trainer disclosed in Figs. 5 to 8, inclusive, is used for CW or continuous wave transmission to distant points. As previously stated this transmitter is installed in three adjoining units and is located on a pedestal just abaft of the radioman's station. The middle unit, which provides the power supply and controls which are common to both the intermediate and high frequency units of the transmitter, comprises two removable chassis 700 and 710 indicated by the two rectangles in the lower portion of Fig. 7 and non-removable panel mounted equipment disclosed in the upper portion of the figure. All conductors between the chassis 700 and the chassis 710 or the panel mounted equipment extend over the terminals of the plug and jack connector 701 and all conductors between the chassis 710 and the chassis 700 or the panel mounted equipment extend over the plug and jack connectors 711 and 712 so that the chassis may be readily removed from the frame of the unit. 27-volt direct current, 115-volt alternating current, ground connection and a side-tone conductor 750 are connected to the middle unit of the transmitter over the plug and jack connector 751. The middle unit is connected to the intermediate frequency unit shown in Fig. 8 by the plug and jack connectors 752 and 753 and to the high frequency unit shown in Figs. 5 and 6 by the plug and jack connectors 754 and 755 so that the units may be easily taken apart.

The chassis 700 comprises the high voltage power supply. Using a full wave rectifier tube 702, 115-volt alternating current applied from power conductor 756 to the primary winding of transformer 703 is rectified and applied through the filter circuit 704 to the 250-volt direct current supply conductor 757. The filament of tube 702 is heated by current applied thereto from the middle secondary winding of transformer 703 and filament heating current is also applied from the upper secondary winding of transformer 703 to the filament supply conductor 713 of the other chassis 710. Chassis 700 is also provided with a transformer 706, the primary winding of which is energized from the 115-volt power supply conductor 756 and from the mid-point grounded secondary winding of which 67½-volt phase $\varphi_1$ and $\varphi_2$ potentials are applied to the phase $\varphi_1$ and $\varphi_2$ conductors 758 and 759 for supplying the bridge circuits of the two transmitter units.

The control chassis 710 has mounted thereon the filament current supply transformers 714 and 715, the primary windings of which are energized from the 115-volt alternating current supply conductor 756. 7½-volt filament current is supplied from the secondary winding of transformer 715 to conductor 760 extending to the oscillator of the intermediate frequency unit of the transmitter and 15-volt filament current is supplied from the secondary windings of both transformers 714 and 715, connected in series, to conductor 761 extending to the oscillator of the high frequency unit of the transmitter.

Also mounted on the horizontal portion of the chassis 710 is a 1600-cycle oscillator tube OSC7, the modulator tube MOD7 for modulating the 250-volt direct current supply of the radio-frequency oscillators of the two transmitter units, the tuning indicator tube TI, transformer 716, output transformer 717 and four control relays 718, 719, 720 and 721. Mounted on a vertical front portion of the chassis, and operable through an opening in the front panel of the control unit is a group of fifteen variable resistors 722 to 736 which may be adjusted to control the meter operating currents for the several tuning conditions. Relays 718, 719 and 720 are operable over terminals of the power control switch PCS mounted on the front panel of the unit and relay 721 is operable under the control of the tuning indicator tube TI.

Mounted on the front panel of the control unit are a meter 762 for indicating the simulated filament voltage used by either transmitter unit and a meter 763 for indicating the simulated plate current used by the transmitter unit selected for use. The filament current may be adjusted by the filament rheostat FR also mounted on the front panel. Two selector switches are also mounted on the front panel, the power control switch PCS having a first or tuning position and ¼, ½ and full power positions and the emission selection switch ESS. Two transmitter selection switches, having their switch arms interconnected for operation by a single switch lever, are mounted on the panel and indicated by the designation TS. A power-on switch PS is also mounted on the panel which controls the connection of 27-volt direct current from the battery source of the trainer to conductor 764 and the connection of 115-volt alternating current from a commercial supply source to conductor 765. Four switches 766 to 769 are mounted in the lower portion of the panel which may be operated from their lower or off positions to their upper or on positions to simulate the introduction of 1, 2, 4, or 5 microfarads alternating current voltage regulation. Immediately below these switches are four jacks 770 to 773, inclusive. The jacks 770 and 771 are connected to the winding of the keying relay 774, mounted under the top wall of the unit, which is operable in response to the closure of a telegraph key on the radioman's table plugged into jack 770. Control of a receiver relay is provided over a cord connected betwen the receiver and the receiver relay jack 771. Jacks 772 and 773 are side-tone jacks and are connected through a fixed resistance 775 and the side-tone rheostat 776 from the left or side-tone coil of the transformer 716 of the circuit of oscillator tube OSC7. The high frequency side-tone jack 773 or the intermediate frequency side-tone jack 772 may be connected by plug ended cords to the jack 488 or 489 of junction box 408 cross connected to jack 418 and jack 417, respectively located above the radioman's table. The volume of the tone to be heard in the radioman's headset receiver may be regulated by the rheostat 776.

Mounted in an insulating bushing on the top wall of the unit is an output terminal 781 for the high frequency unit of the transmitter. This output terminal would ordinarily be connected to either a fixed or a trailing antenna.

The intermediate frequency transmitter unit is disclosed diagrammatically in Fig. 8. The only standard equipment of this unit which has been retained is the oscillator chassis 800 which has been carefully shielded to prevent radiation which might interfere with nearby communication work and provided with filter circuits, and the various panel controls all of which have a distinctive feel and make considerable noise due to the movement of their brushes over terminals or potentiometer windings when operated. The power supply to the apparatus on the chassis 800 is connected from the terminals of the plug and jack connectors 752 and 753 of Fig. 7 over the plug and jack connector 801 and through filter circuits 802, 803 and 804 to the oscillator tube OSC3. The filter circuits have been added for the purpose of preventing radiation from the power supply leads incoming to the oscillator over which filament current, plate potential and control grid potential are supplied to the oscillator tube. The oscillator may be tuned in the usual manner by the M. O. range selector 805 under the control of an M. O. range control on the front panel of the unit and may be tuned by the M. O. tuner 806 under the control of a tuner control on the front panel.

The shaft of the M. O. range selector 805 is connected in any suitable manner, as by a cable belt, with the shaft of an M. O. range selector 807 mounted outside of the shield which surrounds the oscillator and the shaft of the M. O. tuner 806 is connected, as by a cable belt, with the shaft of the potentiometer 808 also mounted outside of the oscillator shield. The potentiometer shaft carries a cam 809 which is instrumental in operating the microswitch 810. As previously stated, a probe 811 is mounted within the oscillator shield to pick up the output carrier frequency of the oscillator this probe being connected with the coaxial system over the coaxial cable 432. An additional probe 812 is also provided which may be connected by a temporary conductor with the frequency meter 450 when it is desired to check the frequency of the output of the oscillator. Conductors from the terminals of the range selector switch 807, from the winding and slider of the potentiometer 808 and from the microswitch 810 are extended over terminals of the plug and jack connector 813 to apparatus mounted on the panel of the unit.

Mounted on the panel of the intermediate frequency unit is a PA range selector switch having two sections 814 and 815 operable by a single panel control lever, an antenna load selector switch 816 operable by a panel control, and an antenna tuning step selector switch 817 operable by a panel control. Also mounted on the panel are two meters one, 818, for indicating in amperes the simulated antenna current or radio frequency output and the other, 819, for indicating in milliamperes the grid current of the simulated power amplifier stage of the transmitter.

Mounted on a second chassis and removable from the frame of the intermediate frequency transmitter unit is the apparatus disclosed in the right portion of Fig. 8 which is provided to enable the operation of the meters 818 and 819 in simulation of their usual response to the tuning controls of the transmitter unit. The apparatus on this chassis is connectable to the apparatus on the panel, to the apparatus on the oscillator chassis 800 and to the apparatus on the power and control unit over the plug and jack connector 820.

Mounted on the horizontal portion of this chassis are two dual amplifier tubes 821 and 822, two dual shunt diode rectifier tubes 823 and 824 and a dual cathode follower tube 825, together with the resistances associated therewith and the transformer 826. The transformer 826 supplies filament heating current to the tubes in a manner to be described hereinafter. Plate potential is applied to the tubes 821, 822 and 825 from the plate voltage supply conductor 757.

Mounted on the vertical portion of the chassis are the control relays 827 and 828 operable by the microswitch 810 to provide antenna loading and antenna tuning discrimination, control relays 829 to 832, inclusive to provide antenna selection discrimination and control relay 833 operable when an antenna has been selected for use. Also mounted on the vertical portion of the chassis are potentiometers 834, 835 and 836, the slider shafts of which are aligned with and operable respectively by the regular power amplifier tuning, antenna tuning and antenna coupling controls, which controls are mounted on the front panel of the unit. The windings of potentiometers 834, 835 and 836 are energized by potential of phase $\varphi_1$ applied thereto from conductor 758 and the winding of potentiometer 808 is energized by potential of phase $\varphi_2$ applied thereto from conductor 759.

Mounted in insulators on the top wall of the cabinet of the unit are three terminals 838, 839 and 840. Terminal 838 is normally used as the output of the power amplifier stage of the intermediate frequency transmitter unit, 839 is the fixed antenna loading input terminal and 840 is the fixed antenna loading output terminal. The jumper 843 is provided for connecting the output terminal 838 of the intermediate frequency transmitter unit with the antenna loading input terminal 839. The output terminal 781 of the high frequency transmitter unit or the antenna loading output terminal 840 of the intermediate frequency unit may be connected by a clip connector to a fixed antenna system, schematically indicated at 842, and the output terminal 781 of the high frequency transmitter unit or the output terminal 838 of the intermediate frequency unit may be connected to a trailing antenna system, schematically indicated at 841.

The high frequency transmitter unit is disclosed diagrammatically in Figs. 5 and 6. The only standard equipment of this unit which has been retained is the oscillator chassis 600, which has been carefully shielded to prevent radiation which might interfere with nearby communication work and provided with filters, and the various panel controls all of which have a distinct feel and make considerable noise when operated. The power supplied to the apparatus on the chassis 600 is connected from the terminals of the plug and jack connectors 754 and 755 of Fig. 7, over the plug and jack connector 601 and through the filter circuits 602, 603 and 604 to the oscillator tube OSC6. The filter circuits have been added for the purpose of preventing radiation from the power supply leads incoming to the oscillator over which filament current, plate potential and control grid potential are applied to the oscillator tube. The oscillator may be tuned in the usual manner by the M. O. range selector 605 having two range selection arcs and operable under the control of a M. O. range control on the front panel of the unit and may be tuned by the M. O. tuner 606 under the control of a M. O. tuner control of the front panel.

The shaft of the M. O. range selector 605 is connected in any suitable manner, as by a cable belt, with the shaft of a M. O. range selector 607 mounted outside of the shield which surrounds the oscillator and the shaft of the M. O. tuner 606 is connected, as by a cable belt, with the shaft of the potentiometer 608 also mounted outside of the oscillator shield. As previously stated a probe 611 is mounted within the oscillator shield to pick up the output carrier frequency of the oscillator, this probe being connected with the coaxial system over the coaxial cable 481. An additional probe 612 is also provided which may be connected by a temporary conductor with the frequency meter 456 when it is desired to check the frequency of the output of the oscillator. Conductors from the terminals of the range selector switch 607 and from the winding and slider of the potentiometer 608 are extended over terminals of the plug and jack connector 613 with apparatus mounted on the panel of this unit.

Mounted on the panel of the high frequency unit are three meters one, 614, for indicating in amperes the simulated antenna current or radio frequency output, the second, 615, for indicating in milliamperes the grid current of the simulated intermediate power amplifier stage of the transmitter and the third, 616, for indicating in milliamperes the grid current of the simulated power amplifier stage of the transmitter. Mounted on a second chassis and removable from the frame of the high frequency transmitter unit is the apparatus disclosed in the left portion of Fig. 6 and in Fig. 5, which apparatus is provided to enable the operation of the meters 614, 615 and 616 in simulation of their usual response to the tuning controls of the transmitter unit. The apparatus on this chassis is connectable to the apparatus on the panel, to the apparatus on the oscillator chassis 600, and to the apparatus on the power and control unit over the plug and jack connector 617.

Mounted on a horizontal shelf portion of this chassis are three dual amplifier tubes 500, 501, 502, shown in Fig. 5, three dual shunt diode rectifier tubes 503, 504 and 505 and two dual cathode follower tubes 506 and 507, together with resistances associated therewith and the transformer 508. Filament heating current for the tubes is supplied from the secondary winding of transformer 508 in a manner to be later described. Plate potential is supplied to tubes 500, 501, 502, 506 and 507 from the plate voltage supply conductor 757.

Mounted on the lower end of the vertical portion of the chassis is a doubler range selector switch 618 and two doubler tuning potentiometers 509 and 510. The shaft of the switch 618 is aligned with and connected to the doubler range tuning control mounted on the front panel of the unit. The shafts on which the sliders of the potentiometers 509 and 510 are mounted are connected together and to the shaft of the doubler tuning control mounted on the front panel of the unit. The winding of potentiometer 509 is energized by potential of phase $\varphi_1$ applied thereto from conductor 758 and the winding of potentiometer 510 is energized by potential of phase $\varphi_2$ applied thereto from conductor 759.

Mounted on the vertical portion of the chassis just below the horizontal shelf portion are two potentiometers 511 and 512 with their slider shafts interconnected and aligned with and connected to the intermediate amplifier tuning control on the front panel of the unit. The winding of potentiometer 511 is energized by potential of phase $\varphi_1$ applied thereto from conductor 758 and the winding of potentiometer 512 is energized by potential of phase $\varphi_2$ applied thereto from conductor 759. Mounted on the vertical portion of the chassis just above the potentiometers 511 and 512 is an intermediate amplifier range selector switch 619, the operating shaft of which is aligned with and connected to the intermediate amplifier range selector control on the panel of the unit. Mounted on the vertical portion of the chassis just above the shelf is a potentiometer 514, the shaft of which is aligned with and connected to the shaft of the power amplifier tuning control on the front panel of the unit and the winding of which is energized by potential of phase $\varphi_1$ applied thereto from conductor 758.

Also mounted on the vertical portion of the chassis beside the potentiometer 514 are three potentiometers 515, 516 and 517 having their slider shafts interconnected and aligned with and connected to the antenna coupling control on the panel of the unit. Mounted near the top of the vertical portion of the chassis are two other potentiometers 518 and 513 having their slider shafts aligned with and connected respectively to the shafts of the antenna capacitance and antenna inductance tuning controls mounted on the panel of the unit. The windings of potentiometers 515, 518 and 513 are connected in series and to conductor 758 and are therefore energized by potential of phase $\varphi_1$. The winding of potentiometer 516 is also connected to conductor 758 and energized by potential of phase $\varphi_1$. The winding of potentiometer 517 is connected to the slider of potentiometer 516 so that the potential derived at the brush of potentiometer 517 varies in accordance with the square of the amount of rotation of the antenna coupling control which rotates the sliders of such potentiometers.

Mounted on the vertical portion of the chassis are seven relays, five of which 620 to 624, inclusive, are operable under the control of the intermediate amplifier range selector switch 619 to selectively vary the potential applied from the phase $\varphi_2$ conductor 759 through the potential divider comprising resistances 625 to 632, inclusive and to selectively vary the potential applied from the phase $\varphi_2$ conductor 759 through the potential divider comprising resistances 633 to 642, inclusive. The junction points between resistances 625 to 632, inclusive, of the first potential divider, are connected to the arc terminals of the doubler range selector switch 618, the brush of which switch is connected over conductor 643 and resistance 519 to conductor 520. The junction points between resistances 633 to 642, inclusive of the second potential divider are connected over contacts of the plug and jack connectors 617 and 613 with the terminals of the M. O. range selector switch 607, the brush of which switch is connected over conductor 644 and through resistance 521 to conductor 520. The other two relays 522 and 523 are provided for controlling the effect of the operation of the antenna coupling and antenna tuning controls on the tubes 502, 505 and 507 when the output terminal 781 of the high frequency unit is connected up. Relay 522 is connected over conductor 524 with the terminal 781.

An antenna feed control switch 525 is also mounted on the front panel of the unit. This switch has a voltage and a current position and in its voltage position, is shunted if relays 522 and 523 have not been operated.

To safeguard a maintenance man against injury from contact with apparatus or circuits carrying high voltage current, plunger switches 777, 778 and 779 are mounted in the side frames of the power and control unit, plunger switch 837 is mounted in the outer side frame of the intermediate frequency transmitter unit and plunger switch 645 is mounted in the outer side frame of the high frequency transmitter unit. The inner side frames of the intermediate and high frequency transmitter units are so drilled opposite the plunger switches 777, 778 and 779 that when the three units are assembled side by side with the plug and jack connectors 752 to 755, inclusive, engaged, the switches 777, 778 and 779 are not operated. With the outside cover plates secured to the outer side frames of the intermediate and high frequency transmitter units, the plunger switches 645 and 837 are operated into their closed positions as illustrated in Figs. 6 and 8. With switches 645 and 837 both operated and the power-on switch PS operated, power from the 115-volt alternating current source is applied over conductor 765, contacts of the plug and jack connector 752, contacts of switch 837, contacts of the plug and jack connector 752, conductor 780, contacts of the plug and jack connector 754, over contacts of switch 645, contacts of plug and jack connector 754 and conductor 756 to the input windings of transformers 703 and 706 in the high voltage power supply unit 700, whereupon high plate voltage is applied to conductor 757 and thus to both the intermediate and high frequency transmitters. Should either end cover be removed, either switch 645 or 837 will open thereby opening the circuit just traced through the primary windings of transformers 703 and 706 to arrest the application of high voltage to the conductor 757.

A branch from conductor 780 extends through the primary winding of transformer 826, from the secondary winding of which 6.3-volt current is supplied to the filaments of tubes 821 to 825, inclusive, and a second branch from conductor 780 extends through the primary winding of transformer 508, from the secondary winding of which 6.3-volt current is supplied to the filaments of tubes 500 to 507, inclusive.

Should the intermediate frequency transmitter unit fail, it may be removed from service by disconnecting it from the power and control unit. When that is done, however, the severing of the plug and jack connectors 752 and 753 opens the circuit previously traced over which 115-volt current is supplied to the power supply unit 700, thereby disabling the high frequency transmitter unit also. To enable the latter transmitter unit to be used, the end cover plate may be removed from the intermediate frequency transmitter unit and secured to the outside frame of the power and control unit where the defective intermediate frequency transmitter unit was removed, thereby operating the plunger switch 777. With switch 777 now operated, 115-volt current is applicable from conductor 765, over the contacts of switch 777, over conductor 780, contacts of plug and jack conductor 754, over the contacts of switch 645, over contacts of plug and jack connector 754, over conductor 756 and thence to the high voltage supply unit 700 whereby high voltage is again supplied to the high frequency transmitter unit. Similarly, if the high frequency transmitter unit is removed and a cover plate is secured to the side frame of the power and control unit from which the transmitter unit was removed, plunger switches 778 and 779 are closed, thereby connecting 115-volt current from conductor 765, over the contacts of plug and jack connector 752, over contacts of switch 837, contacts of plug and jack connector 752, conductor 780, the contacts of switches 778 and 779, over conductor 756 and to the high voltage supply unit 700 whereby high voltage is again supplied to the intermediate frequency transmitter unit.

The apparatus having been described it is believed that the mode of operation of the invention will best be understood from a consideration of a typical problem which the radio instructor might set up to be worked out by crew members under training. Typical communication contacts which might be required for training would involve the transmission of orders, messages covering weather conditions, change in destination, change in route or flight plan, airplane conditions, field traffic conditions and airways traffic conditions. An almost unlimited variety of messages in these and other classifications may be transmitted between the radio instructor and the crew members in the trainer. These messages may be assumed to have points of origin in such places as airport control towers, communication centers, naval bases, ships or carriers, the trainer or other trainers or simulated airplanes. The messages may be transmitted by CW telegraph, tone-modulated telegraph or by voice modulated carrier and may be received in the trainer by the radio operator by either one of the pilots or by the navigator over the intersquadron radio equipment.

The flight instructor may cooperate with the radio instructor by setting up conditions in the trainer which will require communication between the trainer and an assumed base. The radio instructor may order or schedule a change in frequency of the transmitters or receivers or both in order to give the radioman in the trainer practice in tuning the equipment and in operating the frequency indicator.

For example, the radio instructor may initiate a message going to the trainer radioman which will be relayed to the pilot over the interphone system and which will require the pilot to communicate over the intersquadron equipment and after receiving an acknowledgment or answer to recall the radioman and give him a message for transmission by way of radio telegraph to the base. The communication problem just outlined will now be discussed in detail.

The radio instructor places his desk equipment in operating condition by plugging the plugs 1043 and 1045 of his headset 1003, the plug 1046 of his microphone MIC and the plug 1047 of his telegraph key K into the jacks 1042, 1044, 1028 and 1029, respectively, in the jack strip of the desk well and by operating the power switches AC and DC in the turret 113 whereupon the lamps AL and DL light to indicate that the power is on. Switch DC connects 27-volt direct current over cables 927 and 976 to the receiver racks 906 and 909 and switch AC connects 115-volt alternating current over cable 961 to the power junction box 933. With switches 1101 and 1121 operated 115-volt alternating current is applied over cables 965 and 966 from junction box 933 to the rectifier units 1100 and 1110 of Fig. 11 which supply plate potentials to the tubes of the monitoring circuit 1150 of Fig. 11, to the transmitter circuits of Fig. 12 and to the receivers 904, 905, 907 and 908 of Fig. 9. 115-volt alternating current is also applied from junction box 933 over cable 967 to the monitoring circuit 1150 of Fig. 11.

The instructor now tunes the No. 1 receiver unit 904 of the desk to 351 kilocycles by operating the tuning dial 978 of the left unit of the receiver control box 982 on the turret 113, sets the CW—OFF—MCW switch 979 of the control box to the CW position and operates the TEL switch 980 of the control box to the TEL—B position. He sets the transmitter selector switch TS to the position in which an oscillator circuit of Fig. 12 which is tuned to produce a carrier frequency of 351 kilocycles is selected, for example, into position 7, and closes the transmitter power-on switch TP. With switch TP operated and switch TS in position 7 a circuit is established from battery on conductor 1018 over switch TP, conductor 1019, contacts of plug and jack connector 1000, through the filter circuit 1239, through the winding of relay 1216, through the filter circuit 1226, conductor 1067, contacts of the plug and jack connector 1000, over the No. 7 contact and brush of switch TS to ground connected to conductor 1027 over contacts of the plug and jack connector 958, conductor 313 of cable 312, contacts at the junction box 197 of the flight instructor's desk, terminal 314 on the terminal strip 302 at the interphone junction box, and conductor 332 to ground at the radioman's interphone control unit 300. The instructor also operates the transmitter receiver switch TR to its open REC position.

The instructor also sets the emission selector switch SS into its second or CW position. In this position brush 1039 is ineffective to apply ground to conductor 1247 in shunt of resistance 1243, so that the modulator tube MOD remains blocked, brush 1040 is ineffective to apply ground over conductor 1248, through filter 1237 to the upper terminal of the right winding of transformer 1241 so that the tone oscillator tube OSC is not blocked from oscillating, and brush 1036 is effective to establish a side-tone circuit through the side-tone volume control rheostat 1035 and over conductor 1242 through the lower portion of the right winding of transformer 1241.

With the key K plugged into the jack 1029, each time that the key is closed a circuit is established from ground at the TEL—B jack of receiver rack 969, over a conductor of cable 956 to a terminal strip in the turret 113 and thence over conductor 1154 of cable 959, sleeves of jack 1029 and the key plug 1047, over the contacts of key K, tip contacts of the plug 1047 and jack 1029, conductor 1031, contacts of plug and jack connector 1000, conductor 1032, through the filter circuit 1238, through the winding of keying relay 1206, through the filter circuit 1239 and thence as traced over conductor 1019 through the switch TP to battery on conductor 1018. At the same time a circuit is established over a branch of conductor 1031 and contacts of relay 1033, over conductor 1034 of cable 960 and through the windings of relays (not shown but mounted in the receiver rack 906) to battery. Relay 1206 and the receiver relays follow the operation of the key K, the receiver relays serving to switch the receivers from their normal connection with the instructor's headset receiver. The receiver relays being standard equipment and not being directly concerned with the present invention have not been disclosed herein.

Upon each operation of relay 1206, plate potential from the output of rectifier unit 1100 is applied over conductor 1106, contacts of plug and jack connector 1001, through filter 1236, over the contacts of relay 1206, through resistance 1240 to the plate of the tone oscillator tube OSC and through the primary winding of transformer MOT to the plate of the modulator tube MOD.

With the grid of tube OSC connected through the right winding of transformer 1241 and condenser 1249 to the plate of such tube and no ground being connected over conductor 1248 to produce a shunt between the grid and plate, tube OSC oscillates and delivers its 800-cycle output through the secondary winding of transformer MIT to the grid of tube MOD. However, tube MOD is blocked from operation by the resistance 1243 connected to its cathode, since no direct ground has been applied to the cathode to shunt such resistance in the operated position of the emission selector switch SS. The 800-cycle tone generated by the tube OSC is therefore ineffective except to provide a side-tone to be heard by the instructor to apprise him that the transmitter is functioning.

Relay 1206, however, is effective to apply plate potential from conductor 1166, through the filter 1236, over the contacts of relay 1206, through resistance 1244, through resistance 1245 in parallel with the right secondary winding of transformer MOT and over the contacts of the operated selection control relay 1216 to the plate of the left unit of the oscillator tube OSC4 of the oscillator unit 1204. Since this tube is tuned to oscillate at a frequency of 351 kilocycles this frequency output is impressed upon the probe enclosed within the shield of the oscillator and thus over coaxial cable 974 to the coaxial system and is applied intermittently by the operation of relay 1206 in accordance with the code signals keyed through the operation of the key K.

Side-tone is applied from the lower portion of the right winding of transformer 1241, over conductor 1242, over the slider of side-tone volume control rheostat 1035, over brush 1036 of switch SS set into its middle or CW position, over conductor 1037 of cable 960, over a front contact of the operated receiver relay of the receiver relay rack 906 allocated to the No. 1 receiver 904, thence over a conductor of cable 914 and contacts of the key 980 at the receiver control box 902 set into the TEL—B position, thence over another conductor of cable 914 to the receiver rack 906, over a conductor of cable 955 to receiver rack 909, over a conductor of cable 956 to the turret and thence over conductor 1152 of cable 959, over tips of jack 1044 and plug 1045, through the lower or B receiver of the instructor's headset 1003, over the sleeves of the headset plug 1045 and jack 1044, over conductor 1038 of cable 959 and a conductor of cable 956 to ground at the B telephone jack of the rack 909. The instructor heads a side-tone of the signal which he is sending in his B headset receiver.

The message keyed by the transmitter at the instructor's desk is transmitted over the coaxial system including the cable 974, junction box 900, cable 483, junction box 441, cable 442, junction box 416 and cable 412 and is received in the receiver 400 which may be tuned by the radioman in the trainer to receive on the frequency band 200 to 1500 kilocycles. To receive the incoming CW signal, the radioman in the trainer tunes the receiver 400 to receive the carrier frequency of 351 cycles and recognizes the signal as a CW type and therefore operates the emission selector switch of the receiver to its CW position. The signal received by the receiver 400 is transmitted over the cable 402, through junction box 408 and cable 429 to the radioman's interphone control unit 300 where, with the selector switch 305 in position 1, it is transmitted to and heard in the right or B receiver of the radioman's headset receiver 205 in the manner previously described.

Having completed the transmission of the message, the key K remains open and relay 1206 at the transmitter of the desk and receiver relay at the receiver 906 of the desk remain deenergized whereby the receiver 906 is conditioned for reception. At the trainer when the message has been received the radioman operates the switch 306 of his control unit to its upper or interphone on position and proceeds to communicate the information which he has received to the pilot.

To render the interphone system effective the radioman operates the power-on switch 316 whereby power from the 27-volt battery junction box 409 is conducted over the conductors of cable 485, through switch 316, resistance 318 and the filaments of tubes AMP1, AMP2 and AMP3 to ground. Current from conductor 317 is also conducted over conductor 319, through the motor M of the dynamotor unit 320 to ground over conductor 321. The dynamotor unit thus starts into operation and direct current plate potential is now generated by the generator portion G of the unit 320 and delivered over a circuit from ground on conductor 321, through the generator G, over conductor 322 and through resistance 324 to the screen grids of amplifier tubes AMP1 and AMP2 and in parallel through the two halves of the primary winding of transformer T2 to the plates of tubes AMP1 and AMP2 and through resistance 325 through the primary winding of transformer T4 to the plate of tube AMP3.

With the radioman's microphone 209 plugged into the jack 210 current is supplied to the microphone when the talk key 211 is depressed, from battery conductor 317, through the choke coil 326, primary winding of input transformer T1, conductor 327, rings of jack 210 and the microphone plug, through the microphone, over contacts of key 211, sleeves of the microphone plug and jack 210 and conductor 328 to ground. When now the radioman presses the key 211 to talk and speaks into the microphone, speech current is impressed through the windings of input transformer T1 upon the input circuit of the amplifier tubes AMP1 and AMP2 and is amplified by them acting as a push-pull amplifier. The amplified speech current is impressed from the outputs of these tubes through transformer T2 and through the secondary winding of transformer T3 upon the input circuit of amplifier tube AMP3, is amplified by such latter tube and is impressed upon the primary winding of output transformer T4. The output from the secondary winding of transformer T4 is applied over the upper right contacts of switch 306, over the No. 1 contacts of arc 310 of switch 305, assumed to be set in position 1, over conductor 311, tips of jack 204 and plug 212, through the left or A receiver of the radioman's headset 205, thence over the sleeves of plug 212 and jack 204 and conductor 328 to ground.

It will be assumed that at this time the selector switch PSS at the pilot's control box is in its No. 3 selection or No. 4 terminal position, and that the receiver switch 214 at the control box is in its upper or "Out" position. Under these conditions the output of transformer T2 is applied over conductor 329 to a terminal post on strip 302, thence over conductor 330 to a terminal on strip 207, through the potential divider comprising the volume control rheostat 215 and resistance 216 to ground terminal 206 on the strip 207, which terminal is connected over conductors 315 and 332 to ground at the radioman's control unit. From the slider of rheostat 215 a circuit extends over the upper left contacts of switch 214, over the No. 4 terminal and brush 217 of the upper section of switch PSS, over conductor 218, over the tips of jack 219 and plug 220 at the pilot's station box 221, through the right or B receiver of the pilot's headset 222, over the sleeves of plug 220 and jack 219 and conductor 223 to ground terminal 206. A branch from conductor 330 also extends through the potential divider comprising the volume control rheostat 224 and resistance 225 to the ground terminal 206, from the slider of which rheostat a circuit extends over the upper right contacts of switch 214, over the No. 4 terminal and brush 226 of the next to upper section of switch PSS, over conductor 227, over the tips of jack 228 and plug 229 at the copilot's station box 230, through the right or B receiver of the copilot's headset 231 over the sleeves of plug 229 and jack 228 and conductor 232 to the ground terminal 206. A further branch from conductor 330 also extends over conductor 233, through the potential divider comprising the volume control rheostat 234 and resistance 235 at the navigator's station box 236, over conductor 237 to the ground terminal 206, from the slider of which rheostat a circuit extends over the tips of jack 238 and plug 239, through the right or B receiver of the navigator's headset 240, over the sleeves of plug 239 and jack 238 and over conductor 237 to the ground terminal 206. Thus both pilots and the navigator may, if their headsets are plugged into their station boxes, hear the message transmitted over the interphone system by the radioman.

At the same time a branch of conductor 329 extends from a terminal of strip 302 of the interphone junction box 303, over conductor 331 extending through the junction box 107 at the flight engineer's desk and over cable 312, over contacts of plug and jack connector 958, to the monitoring switch S3 in the radio instructor's turret 113. To monitor on the transmission from the radioman's station in the trainer, the instructor operates the switch S3 thereby extending the circuit from conductor 331 through such switch and through the volume control rheostat R3, over conductors 313 and 332 to ground at the radioman's interphone control unit 300. From the slider of rheostat R3 a circuit extends over conductor 1041 of cable 1002 to the control grid of amplifier tube AMP5 of the monitoring amplifier unit 1150. The speech input thus applied to amplifier tube AMP5 is amplified thereby and impressed upon the input of the left unit of amplifier tube AMP8 which further amplifies the speech and applies it over conductor 1151, over the tips of jack 1042 and headset plug 1043 through the upper or A receiver of the radio instructor's headset 1003 and thence over the sleeves of plug 1043 and jack 1042 and over conductors 1154, 1027 of cable 1002, 313 and 332 to ground. Thus the instructor is enabled to monitor and determine if the message which he has transmitted to the trainer has been correctly repeated by the radioman to the pilot.

If the other crew members have their headsets plugged up at their station boxes they are also able to hear the message passed on to the pilot. This is possible since the output from the amplifiers of the radioman's control unit is impressed upon conductor 329 and transmitted over conductor 333 to the station junction box 201. At this box conductor 333 is connected over conductor 241, over the sleeves of jack 242 and plug 243, through the bombardier's headset 244, tips of plug 243 and jack 242, through the volume control rheostat 245 and conductors 246, 334 and 332 to ground and is connected over conductor 335, sleeves of jack 336 and plug 331, through the flight engineer's headset 338, tips of plug 337 and jack 336, through rheostat 339 and over conductors 340, 334 and 332 to ground. Thus the bombardier and the flight engineer may hear the instructions passed on from the radioman to the pilot and may act thereon if necessary. If the maintenance man has plugged up his headset into the jack 247 at the control bay's station box 110 he will also hear the instructions over conductors of cable 200 connecting the station box with the junction box 201.

In addition the flight instructor may also hear the instructions over a branch from the output conductor 329, conductor 331 extending through the junction box 107 at the flight instructor's desk, over conductor 1024, contacts of key 1007, if operated, through the volume control rheostat 1048, over conductor 1049 of cable 1020 and conductors 313 and 332 to ground. From the slider of rheostat 1048 speech current is impressed upon the input circuit of the lower unit of amplifier tube 1010, is amplified by such tube and applied through the lower windings of transformer 1017, over the contacts of jack 1012 and headset plug 1050 to the right or B receiver of the flight engineer's headset 1014.

If the pilot desires to increase the intensity of the reception in his right or B headset receiver and the right or B headset receiver at the copilot's station he may do so by operating the switch 214 to its lower or IN position in which position the output conductor 330 is disconnected and an output circuit from the secondary winding of transformer T4 is extended over conductor 341 to a terminal of terminal strip 302, thence over conductor 342 and over the lower contacts of switch 214 and thence as traced to the right headset receivers of the pilot's and copilot's headsets 222 and 231 respectively. For enabling the radio instructor to monitor on this speech output current, a monitoring conductor 343 extends from the junction point between conductors 341 and 342 on the terminal strip 302, through the junction box 107 and through cable 312, over contacts of the plug and jack connector 958, through the switch S4 when operated, through rheostat R4 to ground over conductor 313, speech current being derived at the slider of rheostat R4 and applied over conductor 1051 of cable 1002 to the input circuit of the right unit of tube AMP5 which amplifies it and impresses it upon the left unit of tube AMP8 which further amplifies it and, as previously described, impresses it upon the upper or A receiver of the instructor's headset 1003.

To acknowledge the receipt of the message from the radioman the pilot depresses the talk key 248 associated with his microphone 249 and speaks. A speech circuit is thereupon established from ground on conductor 223 over sleeves of jack 250 and plug 251, over contacts of key 248, through the microphone 249, over rings of plug 251 and jack 250, conductor 252, brush 253 of the next to the lower section of the selector switch PSS at the pilot's control box set on the No. 4 terminal, over conductor 344, a terminal on terminal strip 302, conductor 345, through the primary winding of input transformer T1, choke coil 326 and to battery on conductor 317. This speech current is impressed upon the inputs of amplifier tubes AMP1 and AMP2, is amplified thereby and by tube AMP3 and applied through transformer T4, over the upper right contacts of switch 306, over the brush of arc 310 of switch 305, assumed to be in position 1, and thence as previously described through the left or A receiver of the radioman's headset 205.

In the meantime the radio instructor tunes his No. 2 radio receiver 905 to the preassigned frequency of 2.85 megacycles, through the operation of the right unit of the receiver control box 902 in the turret 113, sets the CW—OFF—MCW switch 986 of such receiver control box to the MCW position for voice reception and sets the telephone switch 985 to its TEL—B position.

The pilot now proceeds to carry out the instructions which he has received from the radio instructor which it is assumed requires him to communicate with the other airplanes of his squadron by radio. Before proceeding to do this he operates selector switch PSS at his control box 208 into position No. 8 which is the position set aside for the pilot to transmit and receive over a radio channel. The pilot will see that the plug 457 of cord 458 is inserted into the TEL—B jack of the right unit of the receiver control box 428 located on his pedestal and will see that the plug 477 of the cord 478 is inserted in the MIC jack of the transmitter control box 460 which is also located on his pedestal. The pilot will then set the transmitter selector switch 436 into position 1 to select the No. 1 transmitter 452 for use which transmitter it is assumed has previously been tuned to transmit on the frequency of 2.85 megacycles and will set the emission selection switch 487 to its No. 3 or voice position.

To talk with the other airplanes of the squadron the pilot operates the talk key 248 associated with his microphone 249 thereby establishing a speech transmission path from ground over the sleeves of the plug and jack connector 477, over conductor 254 of cord 478, over conductor 223, sleeves of jack 250 and plug 251, contacts of key 248, through the microphone 249, rings of plug 251 of jack 250, conductor 252, brush 253 in engagement with the No. 8 terminal of the next to the lower section of the switch PSS, conductor 257 of cable 478, through the primary winding of the voice input transformer (not shown) of the modulator unit 451 and thence to battery. In the manner fully described in the Patent No. 2,458,550, granted January 11, 1949, to E. L. Baulch, the modulator 451 and transmitter 452 function to transmit by voice modulated emission under the control of the pilot's microphone 249, the emission from the transmitter being applied over the coaxial cable 468, through the coaxial junction box 441, coaxial cable 483, through the junction box 900 and over the coaxial cable 947 to the No. 2 receiver 905 at the radio instructor's desk.

The operation of the talk key 248 also closes a circuit which may be traced in part from ground over the sleeves of the plug and jack connector 477, over conductor 254 of cord 478, conductor 223, sleeves of jack 250 and plug 251, contacts of key 248, over the tips of plug 251 and jack 250, conductor 255, the No. 8 terminal and brush 256 of the lowermost section of switch PSS, conductor 258 of cord 478, over a conductor of cable 454, through windings of relays (not shown but mounted in the receiver rack 425) to battery, whereby such relays operate upon each closure of the contacts of talk key 248 to establish a sidetone circuit from the modulator unit 451, over a conductor of cable 454, over the front contact of the relay of receiver 422, over a conductor of cable 430 to the receiver control box 428, over contacts of switch 490 thereof set into its TEL—B position, over conductor 259 of cord 458, brush 217 of the upper section of switch PSS, set in the No. 1 position, over conductor 218, tips of jack 219 and plug 220, through the right or B receiver of the pilot's headset 222, sleeves of plug 220 and jack 219, conductor 223, and conductor 260 of cord 458 to ground over the sleeves of the plug and jack connector 457 at the receiver control box 428. The pilot is thus enabled to hear a sidetone from the radio transmitter each time that he operates the talk key 248 and speaks.

At the instructor's desk the message transmitted by the pilot is received by the receiver 905, such receiver at this time simulating a receiver which might be installed in another airplane of the same squadron with the airplane being simulated by the trainer. The speech output from the receiver 905 is applied over a circuit which may be traced in part from the output of receiver 905, over a back contact of the receiver relay on receiver rack 906, over a conductor of cable 915, over contacts of switch 985 at the receiver control box 902 set into its TEL—B position, over another conductor of cable 915, tips of the TEL—A and TEL—B jacks of the receivers 904 and 905, tips of the plugs of cord circuits 954 and 955, tips of the TEL—A and TEL—B jacks of the receivers 907 and 908, tip of the plug of cord 956 and over the tip conductor of such cord to the terminal strip in the turret 113, thence over conductor 1152 of cable 959, tips of jack 1044 and plug 1045, through the lower or B receiver of the radio instructor's headset 1003, sleeves of plug 1045 and jack 1044, conductor 1038 of cable 959, terminal strip of the turret 113, sleeve conductor of cord 956 to ground over the sleeve terminals of the plug and TEL—B jack at the receiver 908. The radio instructor thus hears the message transmitted to the pilot in the trainer.

The radio instructor may also monitor on the microphone input applied to the radio transmitter 452 over a branch circuit extending from conductor 257 of cord 478, over conductor 353, through monitoring key S2 when operated, and through rheostat R2 to ground on conductor 1027, a derived speech circuit extending from the slider of rheostat R2, over conductor 1062 of cable 1002 to the control grid of the right unit of tube AMP4 of the monitoring amplifier circuit 1150. Tube AMP4 amplifies the speech input and applies it to the left unit of tube AMP8 which further amplifies it and applies it over conductor 1151 and thence as previously described through the upper or A receiver of the instructor's headset 1003.

Upon the termination of the reception of this message the radio instructor sets the transmitter selector switch TS to its No. 5 or 2.85-megacycle position, sets the emission selector switch SS to its first or voice emission position, operates the IR switch to its right or radio position, and answers the pilot's call by holding the talk key 1052 closed while he speaks into his microphone MIC. The instructor thus simulates the radioman of another airplane when answering this call.

When the selector switch TS is operated into its No. 5 position, a circuit is established from battery on conductor 1018, over switch TP, conductor 1019, contacts of plug and jack connector 1000, through the filter circut 1239, the winding of relay 1214, through filter circuit 1224, conductor 1026, contacts of plug and jack connector 1000, over the No. 5 contact and brush of switch TS and to ground on conductor 1027. With switch SS in its voice emission position, brush 1039 connects ground to conductor 1247 in shunt of resistance 1243 thereby removing the resistance block from the cathode of modulator tube MOD to render this tube effective, brush 1040 connects ground over conductor 1248 through the filter circuit 1237 to the control grid of the tone oscillator tube OSC to render such tube ineffective and brush 1036 prepares the side-tone circuit from the upper left side-tone winding of transformer MOT, over conductor 1246, through resistance 1053 to ground and through resistance 1054 and over brush 1036 to the side-tone conductor 1037 of cable 960.

Each time that the instructor operates the key 1052 to talk, a circuit is established from ground on conductor 1027, over the lower contacts of switch DC, sleeves of jack 1028 and plug 1046, contacts of key 1052, tips of plug 1046 and jack 1028, lower right contacts of switch IR, conductors 1032 and 1031, through filter circuit 1238, through the winding of keying relay 1206, through filter circuit 1239, conductor 1019 and through switch TP to battery on conductor 1018. At the same time a branch circuit is established from conductor 1031, over contacts of relay 1033, conductor 1034 of cable 960 and thence as traced through the windings of the receiver relays mounted within the receiver rack 906 to battery. Relay 1206 and the receiver relays follow the operation of key 1052, the receiver relays serving to switch the receivers from their normal connection with the instructor's upper or A headset receiver.

Upon each operation of relay 1206 plate potential from the output of rectifier unit 1100 is applied to the plate of the modulator tube MOD and through resistance 1244, resistance 1245 in parallel with the right secondary winding of transformer MOT, over contacts of operated selector relay 1214 to the plate of the left unit of oscillator tube OSC3 of oscillator unit 1203. Since the cathode of tube MOD has been connected to ground over conductor 1247 the modulator tube is now responsive to speech input impressed upon the transformer MIT. This speech input is applied over a circuit extending from ground, over the sleeves of jack 1028 and plug 1046, over contacts of key 1052, through the microphone MIC, rings of plug 1046 and jack 1028, through resistance 1055, or directly through the contacts of key 1056 dependent upon the type of microphone used by the radio instructor, over the upper right contacts of switch IR, conductor 1057, through the primary winding of transformer MIT, conductor 1058 and through resistance 1059 to battery on conductor 1018. This speech input is impressed upon the control grid of tube MOD over a circuit extending from ground through the left winding of transformer 1241, through the secondary winding of transformer MIT to the control grid of tube MOD. The output of tube MOD is impressed from the primary winding of transformer MOT upon the right secondary winding of such transformer and thence over the circuit previously traced to the plate of oscillator tube OSC3 whereby the 2.85-megacycle carrier frequency of the oscillator tube OSC3 becomes voice modulated.

Over the side-tone circuit previously traced from the left secondary winding of transformer MOT to conductor 1037 of cable 960, a side-tone of the speech modulated signal impressed upon the probe of the oscillator unit 1203 and applied over coaxial cable 974 to the coaxial system is heard by the instructor in the lower or B receiver of his headset 1003 in the manner previously described. The message thus transmitted over the coaxial system is picked up by the No. 2 receiver 422. This receiver has been tuned by the pilot through the tuning dial 491 at the receiver control box 428 to receive on the carrier frequency of 2.85 megacycles. The output of this receiver is conducted over a back contact of the associated receiver relay (not shown), over a conductor of cable 430, contacts of switch 490 which the pilot has operated to the TEL—B position, tips of the plug and jack connection between cord 458 and the control box 428, over the tip conductor 259 of cord 458, brush 217 of the upper section of switch PSS positioned on the No. 2 terminal, over conductor 218, tips of jack 219 and plug 220, through the right or B receiver of the pilot's headset 222, sleeves of plug 220 and jack 219, conductor 223, and conductor 260 of cord 458 to ground over the sleeves of the plug and jack connector 457 at the control box 428. The pilot is thus enabled to hear the replies from the radiomen of the airplanes of the squadron as simulated by the radio instructor.

The navigator in the trainer may also hear the replies over a branch circuit extending from the terminal 264 in which the cord conductor 259 terminates on the pilot's control box terminal strip 207, over conductor 261, tips of jack 262 and plug 263, through the navigator's left or A headset receiver, sleeves of plug 263 and jack 262, conductor 237 to the terminal on the terminal strip 207 to which the cord conductor 260 is connected.

The radio instructor may monitor on the reception thus incoming to the trainer by operating the monitoring key S1 in the turret 113. With the key operated speech current over conductor 259 of cord 458 is connected from its terminal 264 on the terminal strip 207, over conductor 346, contacts of key S1, through rheostat R1 to ground on conductor 313, a derived circuit extending from the slider of rheostat R1 over conductor 1060 of cable 1002 to the grid of the left unit of amplifier tube AMP4 of the monitoring amplifier unit 1150. This amplifier tube amplifies the received signal and impresses it upon the input circuit of the left unit of amplifier tube AMP8 which further amplifies it and impresses it upon conductor 1151 and thence as traced through the upper or A receiver of the radio instructor's headset 1003.

The copilot may also hear the incoming message over the left receiver of his headset 231 over a branch from terminal 264, over brush 265 and the No. 8 terminal with which it is engaged, conductor 266, tips of jack 267 and plug 268, through the left or A receiver of headset 231, sleeves of plug 268 and jack 267, conductor 232 and thence to cord conductor 260.

The pilot having received the incoming message from the other assumed airplane or airplanes of the squadron, proceeds to recall the radioman in the trainer by operating the recall key 271 and then operates the control switch PSS into either the No. 3 or No. 4 position for enabling him to talk with the radioman. When the key 271 is operated, a circuit is established from ground applied to terminal 266 from the radioman's control unit 300 over the contacts of key 271, conductors 347 and 348 and through the recall lamp 349 at the radioman's interphone control unit 300 to battery on conductor 317. When the radioman sees the lamp lighted, he acknowledges the call by operating his talk key 211 and speaking into his microphone 209 whereupon speech current is impressed upon the primary winding of transformer T1, is amplified by the tubes AMP1 and AMP2 and is impressed from the secondary winding of transformer T2 over the circuit previously traced through the right or B receiver of the pilot's headset 222.

A branch of the circuit over which recall lamp 349 is lighted, extends from conductor 347 over conductor 350 of cable 312, through recall lamp RC in the turret on the radio instructor's desk, over conductor 351 of cable 312 and conductor 352 to battery on conductor 317. The radio instructor is thus informed that the radioman in the trainer is being recalled. He may monitor on the radioman's reply to the recall signal in the manner previously described by operating the monitoring key S3.

Following the response of the radioman, the pilot may then pass to him instructions for replying to the message earlier received from the base radio station. The circuit over which the pilot speaks to the radioman extends from the pilot's microphone 249, over the circuit previously traced, to the primary winding of transformer T1 at the radioman's control unit 300, the speech current being amplified by the amplifier tubes AMP1, AMP2 and AMP3 and impressed as previously described upon the left or A receiver of the radioman's headset 205. The radio instructor may monitor on the transmission to the radioman as previously described by operating the monitoring key S4.

If at the time the original instructions came from the radio instructor, the copilot rather than the pilot had been in charge of the trainer. Then he would have set the control switch PSS at the pilot's control box 208 into position 2 rather than into position 1, whereby circuits similar to those previously traced would be established from the copilot's station box 230 to enable him to control the speech input from his microphone 269 over cable 478 to the radio transmitter 452, to enable him to hear side-tone over the receivers of his headset 231 and to hear an incoming signal received by the radio receiver 422 and transmitted to his headset receivers over cable 458.

If at the time the original instructions come from the radio instructor, both pilots are occupied, the navigator may take charge of the signaling by operating switch 270 at his station box 236, first to its upper position in which position he may acknowledge the reception of the message received from the radioman over the interphone system. With switch 270 in its upper position, when the navigator operates his talk key 272, a circuit is established from ground over conductor 237, sleeves of jack 274 and plug 273 at the navigator's station box 236, through the key 272 and microphone 275, rings of plug 273 and jack 274, upper left contacts of switch 270, conductors 276 and 344, conductor 345 and thence as traced through the primary winding of input transformer T1 at the radioman's control unit 300. This speech current is amplified and applied as previously described to the interphone system where it is heard by the radioman. When later the navigator desires to transmit to other airplanes of the squadron to impart the message received from the radioman of the trainer, he operates the switch 270 to its down position in which position his michophone 275 is connected to the input of the radio transmitter 452 over cord 478, which circuit may be traced in part from conductor 254 of cord 478, over conductor 237, sleeves of jack 274 and plug 273, through the key 272 and microphone 275, rings of plug 273 and jack 274, lower left contacts of switch 270, conductor 277 and thence to conductor 257 of cord 478.

The operation of the talk key also closes a circuit which may be traced in part from ground over conductor 254 of cord 478, conductor 237, sleeves of jack 274 and plug 273, through the key 272, tips of plug 273 and jack 274, lower right contacts of switch 270, conductor 278, conductor 258 of cord 478 and thence as previously traced for controlling the relays of the receiver rack 425 for establishing a side-tone circuit for the modulator unit 451. The side-tone circuit extends as previously traced over conductor 259 of cord 458, conductor 261, tips of jack 262 and plug 263 at the navigator's station box 236, through the left or A receiver of the navigator's headset 240, sleeves of plug 263 and jack 262, conductor 237 and thence to conductor 260 of cord 458.

To transmit a message to the base station, which the radio instructor will receive as though he were a radioman at the base station, the radioman in the trainer uses the transmitter disclosed in Figs. 5 to 8, inclusive. To receive the transmitted message on a carrier frequency of 351 kilocycles, the radio instructor tunes his No. 1 receiver unit 904 to this frequency, operates the CW—OFF—MCW switch 979 of the receiver control box 902 to the CW position and operates the TEL switch 980 of the control box to the TEL—B position. He also resets the transmitter-selector switch TS to the No. 7 position for conditioning the transmitter to transmit on a frequency of 351 kilocycles, sets the emission-selector switch SS to the CW position and operates the switch TR to its receiver or open position.

To prepare the transmitter of Figs. 5 to 8, inclusive for transmission, the radioman in the trainer, with the power switch PS in its off position, sets the switch PCS to its tune position, sets the switch ESS to its CW position, sets the AC compensator switches 766, 767, 768 and 769 to their upper or on positions and, since a frequency of 351 kilocycles is to be used for transmission and therefore the intermediate frequency transmitter unit of Fig. 8 is to be used, he operates the transmitter selector switch TS to its upper or IF position. He also plugs his telegraph key into the key jack 770 and connects the side-tone jacks 772 and 773 by cords with jacks 488 and 489 in the receiver junction box 408 whereby he may receive side-tone in his headset 205. Assuming that the trainer is at the time simulating either a low altitude flight or ground position and the trailing antenna system 841 should not be used, the radioman connects the fixed antenna 842 to the fixed loading output terminal 840 and connects the jumper 843 between the fixed loading input terminal 839 and the radio frequency output terminal 838.

With the switch PCS set upon its tune contact, a circuit is established from ground thereover, over the upper right contacts of the right section of switch TS, conductor 782 extending over contacts of the plug and jack connectors 753 and 801, through the filter circuit 803 and inductance coil 843 to the grid of master oscillator tube OSC8. The radioman now operates the power switch PS to its on-position. 115-volt alternating current is now applied to conductor 765 and thence as previously described to the rectifier unit 700, to the filament transformers 826 and 508 and to the transformers 714 and 715 on the chassis 718 of the power and control unit, and 27-volt direct current is connected to conductor 764.

When the power is turned on, a circuit is established from ground through the fixed antenna 842 connected to terminal 840, through the winding of the K—105 relay 829 and the winding of the K—104 relay 830 in series to battery on conductor 764. Due to the resistance of the fixed antenna 842, the marginal relay 830 does not operate but relay 829 operates, whereupon a circuit is established from ground over the back contact of relay 830, the front contact of relay 829, the antenna loading input terminal 839, connected over the jumper 843 to the antenna output terminal 838, thence through the winding of the K—107 relay 831 and the winding of the K—106 relay 832 in series to battery on conductor 764. Both relays 831 and 832 now operate.

*Tuning the intermediate frequency transmitter unit*

It has been assumed that transmission is to be on a frequency of 351 kilocycles and therefore the radioman now sets the M. O. or master oscillator range selector control A into its second selection position for an emission range between 335 and 390 kilocycles and sets the P. A. or power amplifier range selector control C into its second selection position for an emission range between 320 and 375 kilocycles. He also sets the antenna coupling control H to adjust the slider of potentiometer 836 to its midtap position in which the maximum potential of phase $\varphi_1$ will be applied from conductor 758, over the inner right back contact of the K—103 relay 833, through resistance 844 to the grid of the left unit of amplifier tube 822 to provide the maximum negative impulses on the grids of tube 825. The radioman also sets the M. O. tuning control B into a position, in accordance with the calibration chart of the transmitter, to adjust the tuning coil 806 to a position in which the master oscillator tube OSC8 will oscillate at an approximate frequency of 351 kilocycles. The setting of the control also adjusts the potentiometer 808, the winding of which is energized from the phase $\varphi_2$ supply conductor 759, whereby a potential of phase $\varphi_2$ of a value commensurate with the frequency of 351 kilocycles is applied to conductor 845 and thence through resistance 846 to the grids of amplifier tube 821 and through resistance 847 to conductor 848.

The radioman next operates his telegraph key, which he has plugged into jack 770, whereupon a circuit is established from ground over the sleeves of jack 770 and the key plug through the key and over the tips of the key plug and jack 770 and through the winding of the K—201 keying relay 774, to battery on conductor 764. With relay 774 operated, the PAIG or power amplifier grid current meter 819 operates over a circuit which may be traced from the 250-volt plate supply conductor 757, over contacts of the plug and jack connector 752, through the meter 819, over conductor 849, through the variable resistor 736, conductor 742, over the upper left contact of the left section of switch TS and over upper contacts of keying relay 774 to ground. The resistor 736 is so adjusted that the meter will read about 40 milliamperes. Also in response to the operation of the keying relay 774 250-volt plate potential is applied from conductor 757, over the left front contacts of relay 774, over conductor 799 to the plate of the oscillator tube OSC7 which now functions to produce a 1600-cycle tone, and connects the 250-volt potential to the screen grid of the modulator tube MOD7 and through the primary winding of output transformer 717 to the plate of tube MOD7. The modulator tube MOD7 is not effective, however, since with the emission selector switch TSS set into the CW position its control grid is connected to direct ground. 250-volt potential is also applied from conductor 799, through the secondary winding of transformer 717, over conductor 850 extending over contacts of the plug and jack connectors 752 and 801, through the filter circuit 894, through inductance coil 851 and the horizontal winding of tuning coil 806 to the plate of the master oscillator tube OSC8. This tube will now oscillate at approximately the frequency of 351 kilocycles.

A side-tone from the oscillator tube OSC7 is transmitted to the radioman's headset receivers to apprise the radioman that the transmitter is functioning, over a circuit which may be traced from ground through the left winding of transformer 716 and through the winding of volume control rheostat 776 to ground, a portion of the side-tone current being transmitted from the slider of rheostat 776, through resistance 775 over the tip of jack 772 and the tip conductor of the cord plugged up in the jack, over the tips of interconnected jacks 468 and 418, over the tip conductor 420A of the cord 420 to the No. 5 terminals of the arcs 307 and 310 of control switch 305, which it is assumed the radioman has set into position 5 to enable him to listen in on both receivers of his headset 205, over conductors 308 and 311 through both receivers of the headset 205 and returning over conductor 328, sleeve conductor of cord 420, sleeves of jack 468 and 418, sleeve conductor of the cord connecting jack 488 with jack 772 and to ground on the sleeve of jack 772.

A side-tone circuit is also established from ground through the left winding of transformer 716 and thence to ground through resistances 739 and 740, a branch from the junction point between these resistances extending over conductor 750, conductor 354 extending through the junction box 107 and cable 312, through the monitoring switch S—7 when operated, and through rheostat R—7 to ground on conductor 1027. From the slider of this rheostat a tone input circuit extends over conductor 1063 of cable 1062 to the grid of the left unit of amplifier tube AMP7 of the monitoring amplifier unit 1150. Tube AMP7 amplifies this input and applies it to the right unit of the amplifier tube AMP8, which further amplifies it, and applies it over conductor 1152, over the tips of jack 1044 and plug 1045, through the lower or B receiver of the radio instructor's headset 1003, over the sleeves of plug 1045 and jack 1044 and conductors 1154 and 1027 to ground. The radio instructor is thus able to monitor on the tuning of the intermediate frequency transmitter unit.

To check the frequency output of the master oscillator tube OSC8, the radioman connects the frequency checking terminal connected with the probe 812 located in the shield of the oscillator unit 800 with the ANT terminal of the frequency meter 450, and inserts the plug 448 of cord 449 into the jack 355 in the interphone junction box 303 whereby 27-volt battery is supplied over conductor 303, ground is supplied over conductor 332, plate potential is supplied from the dynamotor unit 320 over conductor 322, through resistance 356 and over conductor 357, and a side-tone circuit is established over conductor 358 extending through the junction box 107 and over cable 312, to monitoring key S—8 when operated, and through the winding of rheostat R—8 to ground on conductor 1027. From the slider of this rheostat a tone input circuit extends over conductor 1066 of cable 1002 to the grid of the right unit of amplifier tube AMP7 of the monitoring amplifier unit 1150. Tube AMP7 amplifies this input and applies it to the right unit of the amplifier tube AMP8, which further amplifies it, and applies it over conductor 1152 and thence as traced through the lower or B receiver of the radio instructor's headset 1003. The instructor is thus enabled by hearing the tone signal to determine that the radioman is using the frequency meter to check his transmitter. The radioman also plugs one of his headset receivers into the telephone jack in the frequency meter 450.

The radioman now sets the frequency meter so that it produces the exact frequency of 351 kilocycles to which the radio transmitter is to be tuned. With the frequency meter connected to the probe 812 of the master oscillator OSC8, the output frequency of such oscillator will be applied to the frequency meter and will produce a beat frequency which will be heard by the radioman in his headset receiver until the oscillator tube OSC8 is tuned to produce the exact 351-kilocycle frequency. The radioman therefore adjusts the M. O. tuning control B until the beat frequency becomes zero and then locks the control B in its adjusted position.

The radio instructor has tuned his No. 1 radio receiver 904 to receive the 351-kilocycle frequency and on CW emission and he will therefore hear the emission from the intermediate frequency transmitter of the trainer since there will be a beat tone produced between the 351-kilocycle frequency emitted from the oscillator unit 800 of the transmitter and the oscillator tube of the receiver 904. The emission by the oscillator unit 800 is picked up by the probe 811 and transmitted over the coaxial cable 482, through junction box 416, cable 442, junction box 441, cable 483, junction box 900 and cable 946 to the probe of receiver 904. As previously described, the output from the receiver 904 is transmitted over cords 954, 955, 956 and 957 to a terminal strip in the turret 113 and thence over conductor 1065 of cable 959, over the tips of jack 1042 and plug 1043 through the upper or A receiver of headset 1003, sleeves of jack 1043 and jack 1042, and conductor 1030 of cable 959 to ground. The microswitch 810 of the intermediate frequency transmitter unit does not operate in response to the operation of the B tuning control unless said control is tuned to a setting of 390 to 590 and until the switch 810 is operated, no circuit is established from ground over its contacts and through the windings of the K—101 and K—102 relays 827 and 828 to battery.

As soon as the emission frequency of the oscillator unit 800 has been accurately set, the radioman disconnects the frequency meter 450, replugs his headset into the jack of his station box and sets the power control switch PCS into its ¼ power position whereupon ground is removed from the grid of the oscillator tube OSC8 and such tube ceases to oscillate. The instructor no longer hearing the carrier frequency beat in his A receiver now knows that the radioman has completed the tuning of the master oscillator unit 800. With the switch PCS in its ¼ power position, a circuit is established from ground over the switch PCS and through the winding of the K—204 relay 720 to battery on conductor 764 whereupon relay 720 operates.

Before proceeding with the operation of the transmitter in simulation of the tuning thereof, it may be noted that the operation of the various meters with the exception of PAIG meter 819 of the intermediate frequency transmitter and the filament voltage meter 762 of the power supply and control circuit of the transmitter is basically the same for all meters and consists of essentially a 60-cycle bridge circuit, the detector of which is an amplifier tube, such as 821, a rectifier tube such as 823 and a cathode follower or "meter tube" such as 825, with a meter connected into its cathode-plate circuit. When the bridge is balanced or in a "tuned" condition no potential is produced at the cathode follower or meter tube grid. The normal or "in tune" current of the meter is met by means of an adjustable series cathode resistor one of which is supplied for each setting of the power control switch PCS as for example the variable resistors 725, 726 and 727, that is, in the ¼, ½ and full power positions.

The bridge consists of two potentiometers one connected to phase $\varphi_1$ conductor 758 or one-half of the 135-volt transformer 706 (center tap grounded) and the other to phase $\varphi_2$ conductor 759 or the other half of the transformer. At balance $E\varphi_1 + E\varphi_2 = 0$. Thus, one potentiometer is positioned by the master oscillator frequency control B and the other produces a balance or is "in tune" at a position determined by frequency. The sliders of these potentiometers are connected to the grid of an amplifier tube through equal high resistances. The output of the amplifier tube operates a shunt diode rectifier which in turn controls the grid of the "meter tube." Off-balance then, either increases or decreases the normal meter current according as the diode is connected positively or negatively. Therefore by using the diode connected in either one way or its reverse, the simulation of a tuning "nul" or a tuning "peak" is produced, that is, a plus diode with respect to ground produces a nul characteristic and a negative diode produces a peak characteristic.

The sharpness of the peaks or nuls, the final value of the current at large unbalances, etc. is controlled by proportioning the parameters of the circuit. Any one of various bridges is made to control any one, part, or all of the meter circuits needed to simulate the actual meter operations by means of integrating resistors from the diodes to the meter tube grid involved. Meter response time is controlled by a comparatively large shunt capacitor when the actual meter is of a thermocouple type otherwise just sufficient capacitance is used to smooth the diode output.

For controlling the power amplifier plate current or PAIp meter 763, the left unit of the meter tube 825 is used under the control of the left units of the amplifier tube 821 and rectifier tube 823, the left unit of rectifier tube 823 being so poled as to produce a tuning peak, and also under the control of both units of the amplifier tube 822 and rectifier tube 824. Both units of tube 824 are so poled as to produce tuning nuls. With the K—103 relay 833 not yet operated, potential of phase φ1 is applied from conductor 758, over conductor 852, over the inner right back contact of relay 833 and through resistance 844 to the grid of the left unit of amplifier tube 822. The alternating current impulses of phase φ1 are amplified by the tube 822 and impressed through resistance 853 to ground. The positive impulses are shunted off to ground through the left unit of the diode rectifier tube 824 but the negative impulses are applied from the amplifier side of resistance 853, through resistance 854 and condenser 855 to ground thereby charging the condenser 855 negatively. The grid of the right unit of amplifier tube 822 is connected over the outer right back contact of relay 833 and through resistance 856 to ground so that the right units of tubes 822 and 824 have no effect at this time. Until the power amplifier tuning control D has been adjusted to simulate the tuning of the power amplifier to the frequency of the master oscillator 800, the potential of phase φ2 applied from the phase φ2 supply conductor 759 by the potentiometer 808 through the setting of the master oscillator tuning control B, over conductor 845 and through resistance 846, will not balance the potential of phase φ1 derived from the phase φ1 supply conductor 758 through the slider of potentiometer 834 and applied through resistance 857 to the grid of the left unit of tube 821, therefore, so long as there is such an unbalanced potential, impulses will be applied to the grid of the left unit of tube 821, amplified by such tube and impressed over a circuit extending through resistances 858 and 859 to ground. The negative impulses are shunted off to ground through the left unit of the diode rectifier tube 823 but the positive impulses are applied from the junction point between the resistances 858 and 859 and through resistance 860 to the condenser 855 to charge it positively. Due to the fact that tube 822 is charging condenser 855 negatively and tube 821 is charging it positively, a potential will appear on the grid of meter tube 825 which will cause it to become conducting.

With tube 825 conducting a circuit is established from the 250-volt supply conductor 757, across the plate-cathode path of tube 825, over conductor 861, over contacts of the plug and jack connector 753, through the variable resistors 725, 726 and 727, over the inner lower contacts of relay 720, conductor 741, over the upper right contacts of the left section of switch TS, over the lower contacts of keying relay 774 and through the PAIp meter 763 to ground. The meter will, therefore, show a reading.

The radioman now adjusts the power amplifier tuning control D and thereby the slider of potentiometer 834 so that the phase φ1 potential gradually increases until it equals the phase φ2 potential applied to the grid of tube 821, and thereby the potential impulses applied to the grid of tube 821 gradually weaken until they cease. As a consequence the positive impulses applied to charge the condenser 855 grow weaker until they cease and the grid of meter tube, as determined by the charge on condenser 855, becomes more negative and tube 825 becomes less conductive to reduce the current flowing through the meter 763 to a minimum which is determined by the initial setting of the variable resistors 725, 726 and 727. The meter should now read about 40 milliamperes.

The antenna coupling control H is now turned to about 30 divisions on its scale and the antenna loading control E and the antenna tuning control F are operated until a combination is found in which the K—103 relay 833 is operated and a reading on the antenna current meter 818 results. The operation of the control E moves the brush of switch 816 and the operation of control F moves the brush of switch 817. With the M. O. range selector switch 807 and the P. A. range selector switch section 814 both previously set into position 2 through the operation of the M. O. range selector control A and the PA range selector control C there will be no effect upon the reading of the PAIp meter 863 until a combination of antenna loading and antenna tuning is reached which will produce resonance or until a circuit is established for relay 833 to cause a decrease of the negative bias on the grid of meter tube 825. In trying for a correct combination of the settings of controls E and F, the best procedure is to set control E into position 1 and then try for resonance with control G in steps 1 to 6 of F then to set control E into position 2 and again try for resonance with control G in steps 1 to 6 of F etc. When the correct combination setting is attained, the circuit of relay 833 will be established, for example, from ground over the brush of switch 807 positioned on its No. 2 contact, over conductor 862, the outer contacts of operated relay 832, conductor 863, over the No. 2 contact and brush of switch 814, the brush of the antenna loading switch 816 when set into its position 3, over conductor 864, over the right back contact of relay 828, conductor 865, the No. 2 contact and brush of the PA range selector switch 815, over conductor 866, over the contacts of relay 831, and through the winding of relay 833 to battery on conductor 764.

With relay 833 operated, the potential of phase φ1 now applied through the potentiometer 836 set by the antenna coupling control H, over the inner left front contact of relay 833 and through resistance 844 to the grid of the left unit of tube 822 will be less than was applied prior to the operation of relay 833 and therefore the strength of the negative impulses applied to the condenser 855 will be less. At the same time potential of phase φ1 is applied from conductor 758, through potentiometer 835, through resistance 867, over conductor 848, over the outer right front contact of relay 833 to the grid of the right unit of amplifier tube 822 and potential of phase φ2 is applied from the phase φ2 supply conductor 759 as modified by potentiometer 808 set by the M. O. tuning control B and over conductor 845, through resistance 847, conductor 848, outer right front contact of relay 833 to the grid of the right unit of amplifier tube 822. Until these potentials become equal through the adjustment of potentiometer 835 by the control G, the right unit of tube 822 functions to amplify the summation of the potentials applied to its grid and to apply the amplified potential through resistances 868 and 869 to ground. The positive impulses are shunted off to ground through the right unit of the diode rectifier tube 824, but the negative impulses are applied from the junction point between resistances 868 and 869 and through resistance 870 to the condenser 855 to charge it negatively. Thus through both units of tube 822, negative impulses are applied to negatively charge condenser 855 and the grid of meter tube 825 is maintained sufficiently negative to cause the meter 763 to give a near minimum reading, Now when the antenna tuning control G is operated to cause the potential of phase $\varphi_1$ applied over the potentiometer 835 to approach the value of the potential of phase $\varphi_2$ applied to the grid of the right unit of tube 822, the strength of the negative impulses applied from the tube 822 for charging condenser 855 decreases and the negative charge of the condenser starts to leak away and consequently the grid of meter tube 825 becomes less negative resulting in an increase in the reading of the PAI$_P$ meter 763 until when the potentials applied to the grid of the right unit of tube 822 balance no further negative impulses are transmitted by the right unit of tube 822 to charge condenser 855 and the charge on the condenser reaches a steady state as determined by the negative charging impulses resulting from the operation of the left unit of tube 822 as determined by the setting of the antenna coupling control H.

Prior to the operation of relay 833 and the setting of control D to balance the phase $\varphi_1$ and phase $\varphi_2$ potentials applied to the grids of amplifier tube 821, impulses of alternating current were applied from the output of the right unit of tube 821 through resistances 875 and 876 to ground. Due to the poling of the right unit of the diode rectifier tube 823, the positive components of these impulses are shunted off to ground but the negative components are applied from the junction point between resistances 875 and 876 through resistance 877 to the condenser 872 to charge such condenser negatively.

With relay 833 operated, the negative impulses applied under the control of the left unit of tube 822, the amplitude of which is determined by the setting of the antenna coupling control H, are applied through the resistance 871 to the condenser 872 which becomes further negatively charged and the negative impulses applied under the control of the right unit of tube 822, the amplitude of which is determined by the setting of the antenna tuning control G, are applied through the resistance 873 to the condenser 872 to further charge such condenser negatively. With the condenser 872 thus charged, the bias on the grid of the right unit of meter tube 825 is such that the tube establishes a circuit for the antenna current meter 818 which may be traced from the 250-volt supply conductor 757, over the plate-cathode path through the right unit of tube 825, over the left contacts of relay 833, through the meter 818, over conductor 874 extending over contacts of plug and jack connectors 753 and 711, through the variable resistors 722, 723 and 724, over the lower contacts of relay 720, over conductor 742, over the upper left contacts of the left section of switch TS and to ground over the upper right contacts of keying relay 774.

When the control G has been adjusted, as previously described, until the potentials of phase $\varphi_1$ and phase $\varphi_2$ applied to the grid of the right unit of tube 822 become balanced, then negative charging impulses are no longer transmitted by the right unit of tube 822 to the condenser 872 and the charge on such condenser leaks off to a value determined by the negative impulses applied thereto by the left unit of tube 822 as determined by the setting of the antenna coupling control H. The negative potential applied by condenser 872 to the grid of the right unit of meter tube 825 is therefore reduced and the current flowing through the meter 818 increases to produce a greater antenna current reading.

The radioman now adjusts the antenna coupling control H to cause the pointer of the PAI$_P$ meter 763 to move to the first red line on its dial. The movement of the control H causes the slider of the potentiometer 836 to move toward the grounded end of the potentiometer winding, thereby reducing the amplitude of the negative impulses applied by the left unit of tube 822 through resistances 854 and 871 to negatively charge condensers 855 and 872 resulting in a reduction of the negative potential on the grids of the meter tube 825 and an increase in current flowing through the meter 763 and through the antenna current meter 818.

The power control switch PCS is now set to its full power position thereby releasing relay 720 and operating the K—206 relay 718. With relay 718 operated, variable resistors 726 and 727 are eliminated from the circuit previously traced through the PAI$_P$ meter 763 and the pointer of such meter thereupon moves to show an increase in the power amplifier plate current and the variable resistors 723 and 724 are removed from the circuit previously traced through the antenna current meter 818 and the pointer of such meter moves to show an increased antenna current reading. The antenna coupling control H is now readjusted thereby readjusting the slider of potentiometer 836 to change the potential of phase $\varphi_1$ applied to the grid of the left unit of tube 822 and as a consequence the negative impulses applied through resistances 854 and 871 to the condensers 855 and 872 reduce the negative potential on the grids of tube 825 until the left unit of tube 825 functions to cause the pointer of the PAI$_P$ meter 763 to move to the second red line on the dial or to read 175 milliamperes, and the right unit of tube 825 functions to cause the reading of the antenna current meter 818 to increase correspondingly.

Upon the reduction of the potential on the grid of the right unit of tube 825 to this extent, potential applied from the junction point of resistances 871, 873 and 877 is applied over conductor 878 extending over contacts of the plug and jack connector 753, over the upper left contacts of the right unit of transmitter selector switch TS and through resistance 737 to the grid of the amplifier tube unit AMP9. Tube AMP9 now amplifies this potential and applies it to the control grid of the tuning indicator tube TI, the latter tube responding to establish a cathode-plate circuit from ground, over the variable resistor 738, over the cathode-plate path through the tube and through the winding of the K—203 plate relay 721 to the 115-volt source of alternating current on conductor 756. Relay 721 upon operating connects a shunt ground over its left contacts to the side-tone circuits, previously traced, over which the radio instructor and the radioman have been receiving side-tones from the tone oscillator tube OSC7 indicative of the fact that tuning of the transmitter has now been completed by the radioman. Over its inner right front contact, relay 721 applies ground over the circuit previously traced to the grid of the master oscillator tube OSC8, whereupon the master oscillator unit 800 reapplies carrier frequency to the coaxial system which is heard by the instructor in his A headset receiver. Relay 721 by opening its back contact removes the shunt path through resistance 743 to ground from the conductor which is supplying plate potential to the plate of the amplifier tube unit AMP9 to remove a portion of the load on the +250 volt battery supply to compensate for the additional load imposed by starting the master oscillator tube OSC8.

The radioman now readjusts the PA tuning control D until the meters 763 and 818 indicate power amplifier plate and antenna currents for the best overall operation of the transmitter. He will then proceed to key the message which he desires to transmit to the distant base, in the case assumed, to be received by the radio instructor, which message will be received by the radio receiver 904 at the radio instructor's desk and applied to the A receiver of the radio instructor's headset 1003. Upon the completion of the transmission the radioman restores the transmitter switches and controls.

In the preceding description of the tuning of the intermediate frequency transmitter unit, a carrier frequency of 351 kilocycles was assumed. Had a carrier frequency in the M. O. range between 300 and 335 kilocycles been selected through the setting of the M. O. range control A into position 1 and a PA range between 300 and 320 kilocycles been selected by the setting of the PA range control C into position 1, then with the fixed antenna 842 and jumper 843 connected as before to cause relays 829, 831 and 832 to be operated and relay 830 to be unoperated, then with relays 827 and 828 unoperated, since the microswitch 810 has not operated, it will become necessary to set the antenna loading switch 816 into position 1 by the operation of control E in order to operate relay 833 to secure an increase in the reading of the PAI$_P$ meter 763 indicative of a condition of resonance. Under this condition, the circuit for relay 833 would be traced from ground over the brush of switch 807 in position 1, over conductor 879, over the inner contacts of relay 832, conductor 880, over the brush of the lower section 814 of the PA range selector in position 1, over the brush of the antenna load switch 816 in position 1, conductor 881, over the left back contact of relay 827, conductor 882, over the brush of the upper section 815 of the PA range selector in position 1, conductor 866, contacts of relay 831 and to battery through the winding of relay 833.

If any frequency between 390 and 590 kilocycles is selected and the M. O. tuning control B is set into the upper portion of its scale, the microswitch 810 will operate and cause the operation of both relays 827 and 828 as previously described. If, for example, the M. O. range selector control A were operated to set the switch 807 into position 3 for a frequency range of 390 to 450 kilocycles, and the PA range selector control C were operated to set the switches 814 and 815 into position 3 for a frequency range of 375 to 450 kilocycles, then when through trial, the antenna loading control E is operated to set switch 816 in position 4, and the antenna tuning step control F is operated to set switch 817 into position 2, a condition simulating resonance will be established and relay 833 will operate to render the meters responsive to the antenna tuning control G. The circuit of relay 833 may be traced from ground over the brush of switch 807 in position 3, over the brush of switch 814 in position 3, over the brush of switch 816 in position 4, over conductor 883, the right front contact of relay 828, conductor 885, the brush of switch 817 in position 2, conductor 884, the left front contact of relay 827, conductor 884, the brush of switch 815 in position 3, conductor 866 and thence as traced to battery through the winding of relay 833.

If, for example, the M. O. range selector control A were operated to set the switch 807 into position 4 for a frequency range between 450 and 540 kilocycles and the PA range selector control C were operated to set the switches 814 and 815 into position 4 for a frequency range between 450 and 500 kilocycles, then when through trial, the antenna loading control E is operated to set switch 816 into position 4 and the antenna tuning step control F is operated to set switch 817 into position 4, a condition simulating resonance will be established and relay 833 will operate to render the meters responsive to the antenna tuning control G. The circuit of relay 833 may now be traced from ground over the brush of switch 807 in position 4, over the brush of switch 814 in position 4, the brush of switch 816 in position 4, over conductor 883, over the right front contact of relay 828, conductor 865 over the brush of switch 817 in position 4, over conductor 885, over the inner right front contact of relay 827, conductor 886, the brush of switch 815 in position 4 and thence over conductor 866 to battery through the winding of relay 833.

If the M. O. range selector control A were operated to set the switch 807 into position 5 for a frequency range between 540 and 600 kilocycles and the PA range selector control C were operated to set the switches 814 and 815 into position 5 for a frequency range between 500 and 590 kilocycles, then when through trial the antenna loading control E is operated to set the switch 816 into position 4 and the antenna tuning step control F is operated to set the switch 817 into position 6, a condition simulating resonance will be established and relay 833 will operate to render the meters responsive to the antenna tuning control G. The circuit of relay 833 may now be traced from ground over the brush of switch 807 in position 5, over the brush of switch 814 in position 5, the brush of switch 816 in position 4, over conductor 883, over the right front contact of relay 828, conductor 865, over the brush of switch 817 in position 6, over conductor 887, over the outer right front contact of relay 827, conductor 888, the brush of switch 815 in position 5, conductor 866 and thence to battery through the winding of relay 833.

The fixed antenna 842 may be attached to the fixed loading output terminal 840 for any frequency and the trailing antenna 841 may be attached to the radio frequency output terminal 838 for any frequency. Since in an actual transmitter for frequencies below 400 kilocycles a longer antenna is necessary, the trailing antenna 841, which may be let out to the required length, should be used and attached to the radio frequency output terminal 838 if the simulated flight is at a sufficient altitude to permit the use of the trailing antenna but if the altitude is insufficient the fixed antenna 842 may be used but with sufficient loading added to secure the length of antenna necessary. In the latter case the fixed antenna should be connected to the fixed loading output terminal 840 and the jumper 843 should be connected between the radio frequency output terminal 838 and the fixed loading input terminal 839. Should the radioman through error attach the trailing antenna 841 to the fixed loading output terminal 840 instead of the fixed antenna, it would not be possible to resonate the transmitter. This condition is simulated since with the antenna so connected the marginal relay 830 would operate in series with the relay 829 thereby opening its back contact and thereby rendering the operation of relay 833 impossible. Also should the radioman connect the fixed antenna 842 directly to the radio frequency output terminal 838, it would not be possible to resonate the transmitter for any frequency between 300 and 390 kilocycles since the antenna would not be sufficiently loaded, a condition simulated by the failure of marginal relay 832 to operate to enable relay 833 to operate.

It is to be noted that if through error the radioman neglects to set the M. O. range control A and PA range control C into corresponding positions, no circuit is effective for relay 833 and therefore the antenna current meter 818 will give no reading, indicative of a failure of the transmitter to become tuned. It is also to be noted that the tuning controls E and F must also be set into positions in which the low frequency transmitter, being simulated, would be correctly tuned for the emission frequency selected in order that relay 833 may operate and permit the antenna current meter 818 to show a reading.

*Tuning the high frequency transmitter unit*

It will now be assumed that a transmission frequency has been assigned for use which is higher than 600 kilocycles and that therefore the radioman should use the high frequency transmitter unit disclosed in Figs. 5 and 6. To condition the transmitter for transmission, with the power switch PS in its off-position, the radioman sets switch PCS into the tune position, sets switch ESS to its CW position, sets the AC compensator switches 766, 767, 768 and 769 to their upper or on-positions and operates the transmitter selector switch TS to its lower or HF position. He also plugs his telegraph key into the key jack 770 and connects the side-tone jacks 772 and 773 by cords with jacks 488 and 489 in the receiver junction box 408 whereby he may receive side-tones in his headset 205. He also connects the trailing antenna 841 with the radio frequency output terminal 781.

With the switch PCS set into the tune position, a circuit is established from ground thereover, over the lower right contacts of the right section of switch PS, conductor 783 extending over contacts of the plug and jack connectors 755 and 601, through the filter circuit 604 to the grid resistor 646 of the tube OSC6 of the master oscillator unit 600. The radioman now operates the A, B, C, D, E, F and G controls of the transmitter in accordance with the calibration chart for the emission frequency to be used and sets the antenna coupling control K to its zero position in which the maximum amplitude of negative impulses is applied to the grids of the meter tube 507 when the 523 relay operates. It will be assumed that transmission is to be on a frequency of 9.0 megacycles and that the M. O. or master oscillator range selector control A is set into its first position as disclosed for an emission range between 9.0 and 10.2 megacycles, the IA or intermediate amplifier range selector control E is set into position 3 for a range between 6.5 and 9.5 megacycles and that the doubler range control C is set into position 3 for a range between 9.0 and 11.6 megacycles.

When the power is turned on by the operation of switch PS to its on-position, 115-volt alternating current is applied to conductor 765 and thence as previously described to the rectifier unit 700, to the filament transformers 826 and 508 and to the transformers 714 and 715 on the chassis 710 of the power and control unit, and 27-volt direct current is connected to conductor 764. With direct current connected to conductor 764 and the trailing antenna 841 connected to the radio frequency output terminal 781, a circuit is established from ground through such antenna, over conductor 524 and through the winding of relay 522 to battery on conductor 764, the relay 522 upon operating causing the operation of relay 523. He then adjusts the filament rheostat FR in the circuit over which filament current is applied to the filament of the oscillator tube OSC6 of the master oscillator unit until the filament meter 762 shows a reading of 10 volts. The circuit over which the filament current is supplied may be traced from ground through the secondary windings of transformers 714 and 715 in series, over conductor 761, through the filter circuit 603 and through the filament of tube OSC6 to ground. To simulate the reading of the meter 762 a branch of this circuit extends through the rheostat FR and through the meter to ground and by a parallel path through resistances 784, 785 and 786 over contacts of switches 766 to 769, inclusive, and to ground over the upper contacts of relay 774 as soon as such relay operates.

With the control E set into position 3, a circuit is established from ground, over the brush of switch 619 controlled thereby, through the winding of relay 622 to battery on conductor 764. Relay 622 thereupon operates and applies potential of phase $\varphi_2$ from the supply conductor 759, over the middle upper contacts of relay 622, through the potential divider comprising resistances 627, 629, 630, 631, 632 and 625 to the ground over the lower contacts of relay 622, applies potential of phase $\varphi_2$ from supply conductor 759, over the upper contacts of relay 622, through the potential divider comprising resistances 637, 639, 640, 641, 642 and 634 to ground over the inner lower contacts of relay 622, and applies potential of phase $\varphi_2$ from the junction point between resistances 654 and 655 of the potential divider including the serially-connected resistances 652 to 657, inclusive, over the inner upper contacts of relay 622, conductor 658 and through resistance 571 to conductor 520.

With the M. O. tuning control A set into position 1, potential of phase $\varphi_2$ is applied from the junction point between resistances 634 and 642 of the potential divider comprising resistances 637, 639, 640, 641, 642 and 634, over conductor 659, over the No. 1 contact and brush of selector switch 607 positioned by the control A, over conductor 644, and through resistance 521 to conductor 520. With the doubler tuning control C set into position 3, potential of phase $\varphi_2$ is applied from the junction point between resistances 630 and 631 of the potential divider including resistances 627, 629, 630, 631, 632 and 625, over conductor 643 and through resistance 519 to conductor 520. Thus as the joint result of the setting of controls A, C and E for the frequency range to be used, a summation potential of phase $\varphi_2$ is applied through resistances 519, 521 and 571 to conductor 520 and from thence through resistance 563 to the grids of amplifier tube 501, and with relay 523 operated, through resistance 559 to the grid of the right unit of amplifier tube 502.

The setting of the M. O. tuning control B into a position in accordance with the calibration chart adjusts the tuning coil 606 to a position in which the master oscillator tube OSC6 will oscillate at the approximate frequency desired. The setting of the control B also adjusts the potentiometer 608, the winding of which is energized from the phase φ2 supply conductor 759, whereby a potential of phase φ2 of an amplitude commensurate with the desired frequency is applied to conductor 647 and thence through resistances 526 and 527 to the grids of amplifier tube 509.

The radioman next operates his telegraph key, which he has plugged into jack 770, whereupon a circuit is established from ground over the sleeves of jack 770 and the key plug, through the key, over the tips of the key plug and jack 770 and through the winding of the keying relay 774 to battery on conductor 764. With relay 774 operated, plate potential is supplied to the plate of tube OSC6 of the master oscillator unit 600 over a circuit which may be traced from the 250-volt supply conductor 757, over the left front contacts of relay 774, conductor 799 through the secondary winding of transformer 717, conductor 850 extending over contacts of plug and jack connectors 754 and 601, through the filter circuit 602 to the plate of tube OSC6, from conductor 799 to the plate of oscillator tube OSC7, which latter tube now functions to produce a 1600-cycle tone, and connects the 250-volt potential to the screen grid and plate of the modulator tube MOD7. The modulator tube does not function, however, since with the emission selector switch ESS set into the CW position, its control grid is connected to direct ground. With plate potential connected to the plate of tube OSC6 and ground connected as previously described to grid resistance 646 and thence through the windings of the tuning coil 606 interconnected over a contact of the M. O. range selector switch 648 as set by the M. O. range selector control A, the tube OSC6 oscillates at approximately the selected emission frequency.

A side-tone from the oscillator tube OSC7 is transmitted to the receivers of the radioman's headset 295 and to the B receiver of the radio instructor's headset 1003 over the circuits previously traced in connection with the use of the intermediate frequency unit.

To check the frequency output of the master oscillator tube OSC6, the radioman connects the frequency checking terminal connected to the probe 612 located in the shield of the oscillator unit 600, with the ANT terminal of the frequency meter 450, inserts the plug 448 of cord 449 into the jack 355, in the interphone junction box, and connects one of his headset receivers into the telephone jack of the frequency meter. He now sets the frequency meter so that it produces the exact desired frequency, then adjusts the M. O. tuning control B of the master oscillator unit 600 until the beat frequency becomes zero and then locks the control B in its adjusted position. As before described, the radio instructor may monitor to determine that the radioman is using the frequency meter to check his transmitter. The emission from the oscillator unit 600 is picked up by the probe 611 and transmitted over the coaxial cable 481, through junction box 416, cable 442, junction box 441, cable 683, junction box 900 and cable 947 to the probe of receiver 905 which the radio instructor has previously tuned to receive on the assigned frequency. The output of receiver 905 is transmitted over cords 954, 955, 956 and 957 and cable 959 to the upper or A receiver of the radio instructor's headset 1003 so that he will hear the emission from the radio transmitter due to the beat between the master oscillator emission frequency and the master frequency of the receiver.

As soon as the emission frequency of the oscillator unit 600 has been accurately set, the radioman may disconnect the frequency meter 450, replug his headset into the jack of his station box and then proceed to resonate the doubler tuning control D for a maximum reading of the intermediate amplifier grid current or IAIG meter 615. The circuit of meter 615 may be traced from the 250-volt supply conductor 757, over the cathode-plate path through the left unit of tube 506, conductor 529, through the meter 615, conductor 649 extending over contacts of the plug and jack connectors 755 and 711, through the variable resistor 735, over the lower left contacts of the left section of switch TS and to ground over the upper contacts of the keying relay 774. Until the doubler tuning control D has been adjusted to simulate the doubler tuning to the frequency selected for emission, the potential of phase φ2 applied from the supply conductor 759 by the potentiometer 608 through the setting of the master oscillator tuning control B, over conductor 647 and through resistance 526 to the grid of the left unit of tube 509 will not balance the potential of phase φ1 derived from the phase φ1 supply conductor 758 over the slider of potentiometer 509, and applied through resistance 530 to the grid of the left unit of tube 509 and therefore so long as there is such an unbalanced potential, impulses will be applied to the grid of the left unit of tube 509, amplified thereby and impressed upon a circuit extending through resistances 531 and 532 to ground. The positive components of the impulses are shunted off to ground through the left unit of the diode rectifier tube 503, but the negative components of the impulses are applied from the amplifier tube side of the resistance 531 to charge the condenser 533 negatively. Due to the fact that the condenser 533 is being charged negatively the grid of the left unit of meter tube 506 will be rendered more negative and will therefore cause the current flowing through the meter 615 to be reduced and the meter to read lower.

As the radioman adjusts the control D and thereby the slider of potentiometer 509, the phase φ1 potential gradually changes until it equals the phase φ1 potential applied to the grid of the left unit of tube 506 and thereby the potential impulses applied to the gride of tube 506 gradually weaken until they cease. As a consequence the negative impulses applied to charge condenser 533 grow weaker until they cease and the grid of meter tube 506 becomes less negative and tube 506 becomes more conductive to increase the current flowing through the meter 615. The reading of the meter thereupon becomes a maximum.

At the same time, the operation of control D causes the reading of the power amplifier grid current or PAIG meter 616 to increase. The circuit of meter 616 may be traced from the 250-volt supply conductor 757, over the cathode-plate path through the right unit of tube 506, over conductor 534, through the meter 616, over conductor 650 extending over contacts of the plug and jack connectors 755 and 711, through the variable resistor 734, over the lower left contacts of the left section of switch TS to ground over the upper contacts of keying relay 774. Until the tuning control D has been adjusted to simulate the doubler tuning to the frequency selected for emission, negative impulses will be applied from the junction point between resistances 531 and 532 and through resistance 535 to charge the condenser 536 negatively thereby causing the grid of the right unit of tube 506 to be rendered sufficiently negative to reduce the current flowing through the meter 616 so that such meter will read low. When, however, the control D has been adjusted so that the potential over the grid of the left unit of tube 500 becomes zero and no further negative impulses are delivered from the tube 500 to charge the condenser 536, then current flowing through the right unit of tube 506 will increase and the meter 616 will show an increased reading.

The radioman next proceeds to resonate the intermediate amplifier tuning control F for a maximum reading of the power amplifier grid current or $PAI_G$ meter 616. Until the tuning control F has been adjusted to simulate the intermediate frequency amplifier tuning to the frequency selected for emission, the potential of phase $\varphi_2$ applied from the supply conductor 759 through the potentiometer 608 to conductor 647 and thence through resistance 527, to the grid of the right unit of tube 500 will not balance the potential of phase $\varphi_1$ derived from the phase $\varphi_1$ supply conductor 758 over the slider of potentiometer 511 and applied through resistance 537 to the grid of the right unit of tube 500 and therefore, so long as there is such an unbalanced potential, impulses will be applied to the grid of the right unit of tube 500, amplified thereby and impressed over a circuit extending to ground through resistances 538 and 539. The positive components of the impulses are shunted off to ground through the right unit of the diode rectifier tube 503 but the negative components of the impulses are applied from the amplifier side of resistance 538 through resistance 540 to the condenser 536 to charge such condenser negatively. Due to the fact that the condenser 536 is thus negatively charged, the grid of the right unit of tube 506 will be made negative by such condenser to hold the reading of meter 616 down. However, when the control F has been so adjusted that the potentials of phase $\varphi_1$ and phase $\varphi_2$ applied to the grid of the right unit of tube 500 become equal, the potential applied to the grid becomes zero and no further negative impulses are transmitted through the right unit of tube 500 for charging the condenser 536 and as a consequence the negative potential on the grid of the right unit of tube 506 decreases thereby causing the current flowing through the right unit of tube 506 to increase to its maximum value and the meter 616 to show its maximum reading.

As a further result of the adjustment of control F, the negative impulses applied through the right unit of tube 500 and from the junction point between resistances 538 and 539 and through resistances 541 and 542 for applying negative charging impulses to the condensers 543 and 544 become zero.

The power control switch PCS is now set to its ¼ power position whereupon ground is removed from the grid of the oscillator tube OSC6 and such tube ceases to oscillate. The instructor no longer hearing the carrier frequency beat in his A receiver now knows that the radioman has completed the tuning of the master oscillator unit 600. With the switch PCS in its ¼ power position, the circuit of the K—204 relay 720 is established from ground over the switch PCS and through the winding of relay 720 and to battery on conductor 764 and relay 720 now operates.

The radioman now resonates the power amplifier plate control G until a minimum reading of the power amplifier plate current or $PAI_P$ meter 763 is obtained. With relay 720 operated, the circuit of meter 763 may be traced from the 250-volt supply conductor 757, over the plate-cathode path through the left unit of meter tube 507, over conductor 545 extending over contacts of the plug and jack connectors 755 and 711, through the adjustable resistors 728, 729 and 730, over the inner upper contacts of relay 720, over the lower right contacts of the left section of switch TS, over the lower contacts of the keying relay 774 and through meter 763 to ground.

As previously described, until the tuning control F was adjusted, the condenser 543 was negatively charged by negative impulses transmitted through the right unit of tube 500. Also until the tuning control D was adjusted the condensers 543 and 544 were both negatively charged by negative impulses transmitted through the left unit of tube 500 and from the junction point between resistances 531 and 532 through resistances 546 and 553. Also negative charging impulses are transmitted to condenser 543 through resistance 547 under the control of the left unit of tube 502. Alternating current impulses of phase $\varphi_1$ are delivered to the grid of tube 502 from the supply conductor 758, through resistances 548 and 549, through the potentiometers 516 and 517 set by the antenna coupling control K which was previously adjusted to its zero position in which the sliders of the potentiometers 516 and 517 are at the lower or ground terminals of their windings, over the inner upper front contact of relay 523 and through resistance 550 to the grid of the left unit of tube 502. The tube 502 amplifies these impulses and applies them through resistance 551 to ground. The positive components of these impulses are shunted to ground through the left unit of diode rectifier tube 505 but the negative components of the impulses are applied through resistance 547 to negatively charge condenser 543 and through resistance 552 to negatively charge condenser 544.

In addition negative charging impulses are applied to condenser 543 through the resistance 554 and to condenser 544 through the resistance 555 under the control of the right unit of amplifier tube 502. Impulses of phase $\varphi_1$ are transmitted from the phase $\varphi_1$ supply conductor 758, through the windings of potentiometers 518, 515 and 513 to ground and the potential derived at the slider of the potentiometer 513, adjusted by the antenna inductance control J, is applied through resistance 556 and over the outer upper front contact of relay 523 to the grid of the right unit of tube 502. Potential of phase $\varphi_2$ is applied from the phase $\varphi_2$ supply conductor 759 under the control of potentiometer 510, previously adjusted by the doubler tuning control D, through resistance 557 to conductor 520, from the phase $\varphi_2$ supply conductor 759 under the control of potentiometer 512, previously adjusted by the IA tuning control F, through resistance 558 to conductor 520, from conductor 647 to which phase $\varphi_2$ potential has been previously applied through the setting of the M. O. tuning control B and through resistance 528 to conductor 520, from the phase $\varphi_2$ supply conductor under the control of the previously adjusted A, C and E controls to conductor 520 and from conductor 520 through resistance 559 to the grid of the right unit of tube 502. Until the tuning controls I, J and K have been resonated so that the potentials of phase $\varphi_1$ and phase $\varphi_2$ applied to the grid of the right unit of tube 502 balance, the unbalanced potential on such grid will be amplified by the tube and applied through resistance 560 to ground. The positive components of the impulses of this amplified potential will be shunted to ground through the right unit of the diode rectifier tube 505, but the negative components of the impulses will be applied through resistances 554 and 555 to negatively charge the condensers 543 and 544.

Also the condenser 543 will be positively charged by positive impulses transmitted through the resistance 561 under the control of the left unit of tube 501 and the condenser 544 will be negatively charged by negative impulses transmitted through resistance 562 under the control of the right unit of tube 501. Until the PA tuning control G has been so adjusted that the potential of phase $\varphi_2$ applied from conductor 529 under the control of the previously adjusted A, B, C, D, E and F controls, through resistance 563 to the grids of tube 501 is made equal to the potential of phase $\varphi_1$ applied from the phase $\varphi_1$ supply conductor 758, through potentiometer 514 and through resistance 564 to the grids of tube 501, alternating current potential will exist on the grids of the tube, will be amplified by the left unit of the tube and applied through resistance 565 to ground and will be amplified by the right unit of the tube and applied through resistance 566 to ground. The negative components of the impulses of the potential applied by the left unit of tube 501 will be shunted to ground through the left unit of the diode rectifier tube 504 but the positive components of the impulses will be applied through resistance 561 to positively charge the condenser 543. The positive components of the impulses of the potential amplified by the right unit of tube 501 will be shunted to ground through the right unit of rectifier tube 504 but the negative components of the impulses will be applied through resistance 562 to negatively charge the condenser 544.

When the control G has been adjusted until the phase $\varphi_1$ and phase $\varphi_2$ potentials applied to the grids of tube 501 balance, there will be zero potential on the grids and no further positive impulses will be applied under the control of the left unit of tube 501 for charging condenser 543 and as a consequence the grid of the left unit of tube 507 will become more negative and the current flowing through the left unit of such tube will become a minimum as determined by the initial settings of the adjustable resistors 728, 729, 730 and a minimum reading of the PAI$_P$ meter 763 will result.

At the time relay 720 operated, a circuit for the antenna current meter 614 was also established from the 250-volt battery on supply conductor 757, over the plate-cathode path through the right unit of meter tube 507, over conductor 567, through the meter 614, over conductor 651 extending over contacts of plug and jack connector 755 and 711, through the adjustable resistors 731, 732 and 733, over the middle upper contacts of relay 720, over the lower left contacts of the left section of switch TS to ground over the contacts of keying relay 774. With the condenser 544 negatively charged through the resistances 542, 552, 553, 555 and 562, as previously described, the grid of the right unit of tube 507 will be sufficiently negative to cause a low space current to flow through the right unit of the tube and consequently to cause the meter 614 to show a low reading. When, however, the PA tuning control G is resonated to cause the right unit of tube 501 to cease transmitting negative impulses through resistance 562 to the condenser 544, the grid of the right unit 507 will become less negative and the reading of the meter 614 will show an increase.

The radioman now sets the antenna feed control H into its No. 1 position, the antenna capacitance control I to the 25 division of its dial, the antenna coupling control K to the 30 division on its dial and then resonates the antenna inductance control J for the maximum reading of the PAI$_P$ meter 763 and the antenna current meter 614. The adjustment of the control K decreases the potential of phase $\varphi_1$ applied from conductor 758, through resistances 548 and 549, through potentiometers 516 and 517 and through resistance 550 to the grid of the left unit of the tube 502, thereby decreasing the amplitude of the negative charging impulses applied from such unit of tube 502 through resistances 547 and 552 to the condensers 543 and 544, whereupon the grids of tube 507 become less negative and the currents flowing through the two units of such tube and through the meters 763 and 614 increase and such meters show higher readings. The adjustment of controls I and K also control the potentiometers 518 and 515 to change the potential of phase $\varphi_1$ applied thereover from the $\varphi_1$ supply conductor 758, through the potentiometer 513 and resistance 556 to the grid of the right unit of tube 502 whereby such potential is brought more nearly into balance with the potential of phase $\varphi_2$ applied to such grid through resistance 559 from conductor 529 in response to the previous adjustment of the A, B, C, D, E and F controls. When now the control J is resonated, it, through the control of potentiometer 513 reduces the potential of phase $\varphi_1$ applied to the grid of the right unit of tube 501 until it equals the potential of phase $\varphi_2$ applied to such grid and the grid being at zero potential no further negative impulses are transmitted through resistances 554 and 555 to charge the condensers 543 and 544 negatively. Consequently the grids of tubes 507 are rendered less negative and the readings of meters 763 and 614 should be further increased.

If with the assumed setting of the antenna capacitance control I, it is not possible through the adjustment of the antenna inductance control J to obtain a condition of resonance, which condition would be simulated by an increase in the readings of meters 763 and 614 to approximately the values specified therefor in the instruction manual for the transmitter, the control I is reset to, for example, 50 divisions of its dial. This moves the slider of potentiometer 518 to shunt out more turns of the potentiometer winding to thereby increase the potential of phase $\varphi_1$ supplied from the supply conductor 758 to enable the potentiometer 513 when the antenna inductance control J is now readjusted to balance out the phase $\varphi_2$ potential supplied from conductor 529 under the control of the A, B, C, D, E and F controls and to thus produce a zero potential on the grid of the right unit of tube 502 to stop the transmission of negative impulses through resistances 554 and 555 to charge the condensers 543 and 544.

The radioman now adjusts the antenna coupling control K until the pointer of the PAI$_P$ meter 763 moves to the first red line on its dial or reads 90 milliamperes. Adjustment of the control K adjusts the sliders of potentiometers 515, 516, and 517. The adjustment of the sliders of potentiometers 516 and 517 reduces the potential of phase $\varphi_1$ applied from conductor 758 to the grid of the left unit of tube 502 whereupon the negative impulses transmitted through resistances 547 and 562 for negatively charging condensers 543 and 544 are reduced, and the movement of the slider of potentiometer 515 changes the potential of phase $\varphi_1$ applied to the grid of the right unit of tube 502 whereupon potential impulses reappear on this grid and negative impulses are again transmitted by the operation of the right unit of tube 502 through resistances 554 and 555 for negatively charging condensers 543 and 544. By the changes thus brought about in the negative charges of condensers 543 and 544, the negative potentials supplied thereby to the grids of meter tube 507 are changed and the readings of meters 614 and 763 are changed until the pointer of meter 763 is brought to the first red line.

The resetting of potentiometer 515 by the control K, which potentiometer is in series with potentiometer 513, throws the potential of phase $\varphi_1$ applied thereby to the grid of the right unit of tube 502 off balance with respect to the potential of phase $\varphi_2$ applied from the conductor 528 under the control of the previously adjusted controls A, B, C, D, E and F so that it now becomes necessary to reset the control J until a balance is restored to reduce to zero the negative impulses transmitted through resistances 554 and 555 under the control of the right unit of tube 502 for negatively charging condensers 543 and 544, whereupon the meters 614 and 763 will show maximum readings for the setting of the power control switch PCS in its ¼ power position.

The power control switch PCS is then moved to its full power position thereby opening the circuit of relay 720 and closing the circuit of the K—206 relay 718. With relay 720 released and relay 718 operated, resistances 729 and 730 are removed from the circuit of the PAIp meter 763 and resistances 732 and 733 are removed from the circuit of the antenna current meter 614. The antenna coupling control K and the antenna inductance control J are now alternately operated as previously described until the power amplifier plate current meter 763 shows a reading of 175 milliamperes.

In the new setting of the control K, the potentiometers 516 and 517 are so set as to greatly reduce the potential of phase $\varphi_1$ applied to the grid of the left unit of tube 502 and thereby the negative charging impulses transmitted under the control of tube 502 through resistance 552 to conductor 568 extending over contacts and plug and jack connectors 755 and 711, over the lower left contacts of the right section of switch TS and through resistance 737 to the grid of the amplifier tube unit AMP9. Tube unit AMP9 amplifies this potential and applies it to the control grid of the tuning indicator tube TI, the latter tube responding to establish the previously traced circuit for relay 721. Relay 721 upon operating connects a shunt ground over its left contacts to the sidetone circuits previously traced over which the radio instructor and the radioman have been receiving side-tone from the tone oscillator tube OSC7, indicative of the fact that tuning of the transmitter has been completed by the radioman and, over its inner right front contact relay 721 applies ground over the circuit previously traced to the grid of the master oscillator tube OSC6 whereupon the master oscillator tube unit 600 reapplies carrier frequency to the coaxial system which is heard by the instructor in his A headset receiver. Relay 721 by opening its back contact removes the shunt path through resistance 743 to ground from the supply conductor which supplies plate current to the plate of the amplifier tube AMP9 to insure that relay 721 will be maintained operated.

The radioman now readjusts the power amplifier tuning control G thereby causing a rebalance between the potentials of phase $\varphi_1$ and phase $\varphi_2$ applied to the grids of tube 501 until there is a zero potential on the grids and no further positive impulses will be applied under the control of the left unit of tube 501 for charging condenser 543 and as a consequence the grid of the left unit of tube 507 will become more negative and the current flowing through the left unit of such tube will decrease and a minimum reading of the PAIp meter 763 will result. The radioman now proceeds to key the message, operating the alternating current voltage compensation switches 766 to 769, inclusive, from their upper to their lower positions in such combinations as to include one or more of the resistances 787 to 791, inclusive, into the circuit extending from the 15-volt filament supply conductor 761, through the filament rheostat FR, over the upper contacts of relay 718, through the resistances selected by the operation of switches 766 to 769, inclusive to ground over the upper contacts of keying relay 774 so that the meter 762 which is connected in parallel with the circuit just traced will show a minimum of fluctuation during keying. The rheostat FR is set at this time so that the filament meter shows a reading of 10 volts.

If a tone modulated signal is desired, the emission selector switch ESS is set into its MCW position thereby removing the direct ground from the grid of the modulator tube MOD7 so that the modulator tube is no longer blocked and the output of the tone oscillator tube OSC—7 which responds to the operation of the keying relay 774 is applied to the grid of the modulator tube MOD7 and the tone modulated output of tube MOD7 is applied to the plate of the master oscillator tube OSC6.

If the radioman attempts to operate the transmitter with no antenna connected to the radio frequency output terminal 781, relays 522 and 523 will not be operated and as a consequence the antenna current meter 614 will show no antenna current reading when the radioman attempts to tune the transmitter since this meter will be shunted over conductors 567 and 569 and over the lower back contacts of relays 522 and 523. Also the meter will show no reading even with relays 522 and 523 both operated if the radioman neglects to operate the control H to its No. 1 or current terminal. With relay 523 unoperated, ground through resistance 570 is applied over its upper back contact to the grid of the right unit of tube 502, thereby blocking the operation of such tube unit and potential of phase $\varphi_1$ is applied from supply conductor 758, through resistance 548 and over the inner upper back contact of relay 523 to the grid of the left unit of tube 502 whereby the negative impulses applied under the control of the left unit of tube 502 for charging the condensers 543 and 544 are greatly increased to make the grids of tube 507 more negative and to thereby prevent any increase in the reading of the PAIp meter 763.

With relay 523 unoperated, the antenna capacitance, antenna coupling and antenna inductance controls I, J and K are without effect on the reading of the meter 763.

If the controls A, B, C, D and E are set into other positions for emission on a different frequency, the value of the potential of phase $\varphi_2$ applied to conductors 520 and 647 will be different and will therefore require a different setting of the control G to obtain a reading of the PAIp meter 763 indicative of a condition of simulated resonance.

Furthermore, the values of the resistances 625 to 642, inclusive, 652 to 657, inclusive, 519, 521, 528, 557, 558 and 571 are so chosen that the correct combination settings of the controls must be made for any selected emission frequency to secure the operation of the meters 763 and 614 indicative of the correct tuning of the transmitter.

What is claimed is:

1. In a device for simulating a radio transmitter, an oscillator for generating a carrier frequency, means for controlling the emission from said oscillator in accordance with signals which it is desired to transmit, tuning controls for tuning said oscillator, other tuning simulation controls, a source of current, means controlled by said tuning controls for deriving potentials from said source commensurate with the tuning effects of said controls, meters, and electronic devices responsive respectively to the summations of different ones of said potentials for selectively controlling said meters whereby said meters are operated in simulation of the usual operation of the meters of an actual radio transmitter in response to the tuning of said actual radio transmitter.

2. In a device for simulating a radio transmitter, an oscillator for generating a carrier frequency, means for controlling the emission from said oscillator in accordance with signals which it is desired to transmit, a first tuning control for tuning said oscillator, a second tuning simulation control, oppositely phased sources of alternating current, means controlled by said first tuning control for deriving a potential from one of said sources commensurate with the tuning effect of said first control, means controlled by said second tuning control for deriving a potential from the other of said sources commensurate with the tuning effect of said second tuning control, a meter, and electronic devices responsive to the summation of said derived potentials for controlling said meter whereby said meter is operated in simulation of the usual operation of the meter of an actual radio transmitter in response to the tuning of said actual radio transmitter.

3. In a device for simulating a radio transmitter, an oscillator for generating a carrier frequency, means for controlling the emission from said oscillator in accordance with signals which it is desired to transmit, a first tuning control for tuning said oscillator, a second tuning simulation control, oppositely phased sources of alternating current, means controlled by said first tuning control for deriving a potential from one of said sources commensurate with the tuning effect of said first control, means for deriving a potential from the other of said sources commensurate with the tuning effect of said second tuning control, a meter, a meter control tube for controlling the circuit of said meter, a condenser for controlling the bias on the grid of said tube, an amplifier tube for summing said derived potentials and for applying the amplified summation potential to said condenser, rectifying means for rendering the negative components of said amplified potential ineffective and other amplifying means for rendering the positive components of said amplified potential ineffective to charge said condenser whereby said meter control tube is effective to operate said meter in simulation of the usual operation of the corresponding meter of an actual radio transmitter in response to the tuning of said actual radio transmitter.

4. In a device for simulating a radio transmitter, an oscillator for generating a carrier frequency, means for controlling emission from said oscillator in accordance with signals which it is desired to transmit, a first tuning control for tuning said oscillator, a second tuning simulation control, oppositely phased sources of alternating current, means controlled by said first tuning control for deriving a potential from one of said sources commensurate with the tuning effect of said first control, means for deriving a potential from the other of said sources commensurate with the tuning effect of said second tuning control, a meter, a meter control tube for controlling the circuit of said meter, a condenser for controlling the bias on the grid of said tube, an amplifier tube for summing said derived potentials and for applying the amplified summation potential to said condenser, and a diode rectifier tube one element of which is effective to shunt the negative component of said amplified summation potential to ground and the other element of which is effective to shunt the positive component of said amplified summation potential to ground, whereby said unshunted component is effective to charge said condenser and to thereby control said meter control tube to operate said meter in simulation of the usual operation of the corresponding meter of an actual radio transmitter in response to the tuning of said actual radio transmitter.

5. In a device for simulating a radio transmitter, an oscillator for generating a carrier frequency, means for controlling the emission from said oscillator in accordance with signals which it is desired to transmit, a first tuning control for tuning said oscillator, a second tuning simulation control, oppositely phased sources of alternating current, means controlled by said first tuning control for deriving a potential from one of said sources commensurate with the tuning effect of said first control, means controlled by said second tuning control for deriving a potential from the other of said sources commensurate with the tuning effect of said second control, a meter, a meter control tube for controlling the circuit of said meter, a condenser for controlling the bias on the grid of said tube, an amplifier tube for summing said derived potentials and for applying the amplified summation potential to said condenser, and a diode rectifier tube for shunting the negative component of said amplified potential to ground, whereby the positive component of said amplified potential is effective to charge said condenser and to thereby control said meter control tube to operate said meter in simulation of the usual operation of the corresponding meter of an actual radio transmitter in response to the tuning of said actual radio transmitter.

6. In a device for simulating a radio transmitter, an oscillator for generating a carrier frequency, means for controlling the emission from said oscillator in accordance with signals which it is desired to transmit, a first tuning control for tuning said oscillator, a second tuning simulation control, oppositely phased sources of alternating current, means controlled by said first tuning control for deriving a potential from one of said sources commensurate with the tuning effect of said first control, means controlled by said second tuning control for deriving a potential from the other of said sources commensurate with the tuning effect of said second control, a meter, a meter control tube for controlling the circuit of said meter, a condenser for controlling the bias on the grid of said tube, an amplifier tube for summing said derived potentials and for applying the amplified summation potential to said condenser, and a diode rectifier tube for shunting the positive component of said amplified potential to ground whereby the negative component of said amplified potential is effective to charge said condenser and to thereby control said meter control tube to operate said meter in simulation of the usual operation of the corresponding meter of an actual radio transmitter in response to the tuning of said actual radio transmitter.

7. In a device for simulating a radio transmitter, an oscillator for generating a carrier frequency, means for controlling the emission from said oscillator in accordance with signals which it is desired to transmit, means for simulating the connection of an antenna to the radio frequency output terminal of an actual transmitter, tuning controls for tuning said oscillator, other tuning simulation controls, a source of current, means controlled by said tuning controls for deriving potentials from said source commensurate with the tuning effects of said controls, meters, electronic devices responsive respectively to the summations of different ones of said potentials for selectively controlling said meters, and means operative only if the simulated antenna has been properly connected for rendering said electronic devices effective to control said meters in a manner to show readings corresponding to the readings of the corresponding meters of a correctly tuned actual transmitter provided with an adequate antenna system.

8. In a device for simulating a radio transmitter, an oscillator for generating a carrier frequency, means for controlling the emission from said oscillator in accordance with signals which it is desired to transmit, means for simulating the connection of an antenna to the radio frequency output terminal of an actual transmitter, a first tuning control for tuning said oscillator, a second tuning simulation control, oppositely phased sources of alternating current, means controlled by said first tuning control for deriving a potential from one of said sources commensurate with the tuning effect of said first control, means controlled by said second tuning control for deriving a potential from the other of said sources commensurate with the tuning effect of said second tuning control, means for deriving a potential from said other source indicative that the antenna simulating means has not been properly connected, meters, and electronic devices responsive respectively to the summations of different ones of said derived potentials for selectively controlling said meters, said electronic devices being effective only if the simulated antenna has been properly connected to control said meters in a manner to show readings corresponding to the readings of the corresponding meters of a correctly tuned actual transmitter provided with an adequate antenna system.

9. In a device for simulating a radio transmitter, an oscillator for generating a carrier frequency, means for controlling the emission from said oscillator in accordance with signals which it is desired to transmit, means for simulating the connection of an antenna to the radio frequency output terminal of an actual transmitter, a first tuning control for tuning said oscillator, a second tuning control for simulating the tuning of the power amplifier stage of an actual transmitter, a third tuning control for simulating antenna coupling, a fourth tuning control for simulating antenna tuning, a source of current, means controlled by said controls for deriving potentials from said source commensurate with the tuning effects of said controls, meters, electronic devices responsive respectively to the summations of different ones of said potentials for selectively controlling said meters, and means operative only if said antenna simulating means has been properly connected for rendering said third and fourth control means effective to control said electronic devices to control said meters in a manner to show readings corresponding to the readings of the corresponding meters of a correctly tuned actual transmitter provided with an adequate antenna system.

10. In a device for simulating a radio transmitter, an oscillator for generating a carrier frequency, means for controlling the emission from said oscillator in accordance with signals which it is desired to transmit, means for simulating the connection of an antenna to a radio frequency output terminal of an actual transmitter, a first tuning control for tuning said oscillator, a second tuning control for simulating the tuning of the power amplifier stage of an actual transmitter, a third tuning control for simulating antenna coupling, a fourth tuning control for simulating antenna tuning, oppositely phased sources of alternating current, means controlled by said first control for deriving a first potential from one of said sources commensurate with the tuning effect of said first control, means for deriving a second potential from the other of said sources commensurate with the tuning effect of said second control, means for summing said first and second potentials, means for deriving a third potential from the other of said sources commensurate with the tuning effect of said third control, means for deriving a potential from the other of said sources commensurate with the tuning effect of said fourth control, means for summing said first and fourth potentials, meters, a meter control tube responsive to the summation of said summation potentials and said third potential, and means operative only if said antenna simulating means has been properly connected for rendering said meter control tube responsive to said third potential and to the summation of said first and fourth potentials to cause said meters to show readings corresponding to the readings of the corresponding meters of a correctly tuned actual transmitter provided with an adequate antenna system.

11. In a device for simulating a radio transmitter, an oscillator for generating a carrier frequency, means for controlling the emission from said oscillator in accordance with signals which it is desired to transmit, tuning controls for tuning said oscillator, other tuning simulation controls, a source of current, means controlled by said tuning controls for deriving potentials from said source commensurate with the tuning effects of said controls, meters, electronic devices responsive respectively to the summations of different ones of said potentials for selectively controlling said meters, whereby said meters are operated in simulation of their usual operation in response to the actual tuning of a radio transmitter, a power control switch having a plurality of power control steps, resistors included in the circuit of said meters and adjustable to determine the minimum readings of said meters for each power control step position of said switch, and means responsive to the advance of said switch through its power increasing steps to successively reduce the number of resistors in the circuit of each meter, whereby the readings of said meters are increased to simulate the operation of the corresponding meters of an actual transmitter with increased power output.

12. In a device for simulating a radio transmitter, an oscillator for generating a tone frequency, an instructor's desk, headset receivers at said desk, means for deriving a side-tone from said oscillator and for applying it to a receiver of said headset, tuning simulation controls, a source of current, means controlled by said tuning controls for deriving potentials from said source commensurate with the tuning effects of said controls, electronic devices responsive to the summation of said potentials, and means operative by said electronic devices when said tuning controls have been so adjusted as to simulate the tuning of an actual transmitter to arrest the application of said side-tone to the radio instructor's headset receiver as a signal that the tuning of the simulated transmitter has been completed.

13. In a device for simulating a radio transmitter, an oscillator for generating a tone frequency, an instructor's desk, headset receivers at said desk, means for deriving a side-tone from said oscillator and for applying it to a receiver of said headset, tuning simulation controls, a source of current, means controlled by said tuning controls for deriving potentials from said source commensurate with the tuning effects of said controls, electronic devices responsive to the summation of said potentials, a tuning indicator tube operable by said electronic devices when said tuning controls have been so adjusted as to simulate the tuning of the transmitter, and a relay controlled by said tuning indicator tube to arrest the application of said side-tone to the radio instructor's headset receiver as a signal that the tuning of the simulated transmitter has been completed.

14. In a device for simulating a radio transmitter, an oscillator for generating a carrier frequency, an instructor's desk, headset receivers at said desk, a radio receiver at said desk for detecting the emission from said oscillator and for applying the detected signal to a receiver of said headset, tuning controls for tuning said oscillator, a power control switch having a tune and a plurality of power control steps, means controlled by said switch when in its tune position for rendering said oscillator effective to transmit a signal to be heard by the instructor to inform him that the oscillator is being tuned and for rendering said oscillator ineffective to emit when advanced to any one of its power control steps to inform the instructor that the tuning of the remainder of the simulated transmitter is being accomplished, other tuning simulation controls, a source of current, means controlled by said controls for deriving potentials from said source commensurate with the tuning effects of said controls, electronic devices responsive to the summation of said potentials, and means operable by said electronic devices when said tuning controls have been so adjusted as to simulate the complete tuning of an actual transmitter to re-enable said oscillator whereby said instructor is informed that the tuning has been completed.

15. In a device for simulating a radio transmitter, an oscillator for generating a carrier frequency, means for controlling the emission from said oscillator in accordance with signals which it is desired to transmit, a control for simulating the selection of an oscillator frequency range of emission, a control for simulating the selection of a power amplifier frequency range, other tuning simulation controls, a source of current, means controlled by said latter tuning controls for deriving potentials from said source commensurate with the tuning effects of said latter controls, meters, electronic devices responsive respectively to the summations of different ones of said potentials for selectively controlling said meters, and means effective only if said range selecting controls are set into corresponding range positions for rendering said electronic devices effective to control said meters in a manner to show readings corresponding to the readings of the corresponding meters of an actual radio transmitter in response to the tuning of said actual transmitter.

16. In a device for simulating a radio transmitter, an oscillator for generating a carrier frequency, means for controlling the emission from said oscillator in accordance with signals which it is desired to transmit, a control for simulating the selection of an oscillator frequency range of emission, a control for simulating the selection of a power amplifier frequency range, a control for simulating the selection of an antenna tuning step, a control for simulating the determination of the antenna loading, other tuning simulation controls, a source of current, means controlled by said latter tuning controls for deriving potentials from said source commensurate with the tuning effects of said latter controls, meters, electronic devices responsive respectively to the summations of different ones of said potentials for selectively controlling said meters, and means effective only if said range selecting controls are set into corresponding range positions and said antenna tuning step and said antenna loading controls are set into the correct positions for emission on the desired frequency, for rendering said electronic devices effective in response to the operation of said other controls to control said meters in a manner to show readings corresponding to the readings of the corresponding meters of an actual radio transmitter in response to the tuning of said actual transmitter.

17. In a device for simulating a radio transmitter, an oscillator for generating a carrier frequency, means for controlling the emission from said oscillator in accordance with signals which it is desired to transmit, means for simulating a fixed antenna, means for simulating a trailing antenna, tuning controls for tuning said oscillator, other tuning simulation controls, a source of current, means controllable by said controls for deriving potentials from said source commensurate with the tuning effects of said controls, meters, electronic means responsive respectively to the summations of different ones of said potentials for selectively controlling said meters, and means operative only if said oscillator is tuned above a specified emission range and there has been no erroneous connection of said fixed antenna to the radio frequency output terminal of the transmitter for rendering said electronic devices effective to control said meters in a manner to show readings corresponding to the readings of the corresponding meters of an actual radio transmitter when said actual transmitter is tuned while provided with an antenna having sufficient loading for efficient radiation.

18. In a device for simulating a radio transmitter provided with a radio frequency output terminal and fixed antenna loading input and output terminals, an oscillator for generating a carrier frequency, means for controlling the emission from said oscillator in accordance with signals which it is desired to transmit, means for simulating a fixed antenna, means for simulating a trailing antenna, a loading jumper, tuning controls for tuning said oscillator, other tuning simulation controls for tuning said transmitter, a source of current, means controlled by said controls for deriving potentials from said source commensurate with the tuning effects of said controls, meters, electronic devices responsive respectively to the summations of different ones of said potentials for selectively controlling said meters, and means operative when said loading jumper is used to apply antenna loading by the interconnection of said radio frequency output terminal and said loading input terminal and there has been no erroneous connection of said trailing antenna to said loading output terminal, for rendering said electronic devices effective to control said meters in a manner to show readings corresponding to the readings of the corresponding meters of an actual radio transmitter when said actual transmitter is tuned while provided with an antenna having sufficient loading for efficient radiation.

19. In a device for simulating a radio transmitter, an oscillator for generating a carrier frequency, means for controlling the emission from said oscillator in accordance with signals which it is desired to transmit, a control for simulating the selection of an oscillator frequency range of emission, a control for simulating the selection of a power amplifier frequency range, a control for simulating the selection of an antenna tuning step, a control for simulating the determination of the antenna loading, means for varying the effect of the settings of said antenna tuning step and said antenna loading controls in accordance with whether the selected oscillator emission frequency is below or above a predetermined frequency, other tuning simulation controls, a source of current, means controlled by said latter tuning controls for deriving potentials from said source commensurate with the tuning effects of said latter controls, meters, electronic devices responsive respectively to the summations of different ones of said potentials for selectively controlling said meters, and means effective only if said range selecting controls are set into corresponding range positions and said antenna tuning step and said antenna loading controls re set into the correct positions for emission on the desired frequency, for rendering said electronic devices effective in response to the operation of said other controls to control said meters in a manner to show readings corresponding to the readings of the corresponding meters of an actual radio transmitter in response to the tuning of said actual radio transmitter.

20. In a device for simulating a radio transmitter, an oscillator for generating a carrier frequency, means for controlling the emission from said oscillator in accordance with signals which it is desired to transmit, controls for simulating the selection of the oscillator frequency range and the doubler and the intermediate amplifier frequency ranges, controls for tuning the oscillator and for simulating the tuning of the intermediate and power amplifier stages, antenna capacitance, inductance and coupling controls, a source of current, means controlled by said controls for deriving potentials from said source commensurate with the tuning effects of said controls, meters, and electronic devices responsive respectively to the summations of different ones of said potentials for selectively controlling said meters whereby said meters are operated in simulation of the usual operation of the corresponding meters of an actual radio transmitter in response to the tuning of said actual radio transmitter.

21. In a device for simulating a radio transmitter, an oscillator for generating a carrier frequency, means for controlling the emission from said oscillator in accordance with signals which it is desired to transmit, controls for simulating the selection of the oscillator frequency range and the doubler and intermediate amplifier frequency ranges, controls for tuning the oscillator and for simulating the tuning of the intermediate and power amplifier stages, antenna capacitance, inductance and coupling simulation controls, oppositely phased sources of alternating current, means controlled by said range selection and said oscillator and stage tuning controls for deriving potentials from one of said sources commensurate with the tuning effects of said controls, means controlled by said antenna capacitance, inductance and coupling controls for deriving potentials from the other of said sources commensurate with the tuning effects of said controls, meters, and electronic devices responsive respectively to the summations of different ones of said derived potentials for selectively controlling said meters whereby said meters are operated in simulation of the usual operation of the corresponding meters of an actual radio transmitter in response to the tuning of said actual radio transmitter.

22. In a device for simulating a radio transmitter, a master oscillator for generating a carrier frequency, means for controlling the emission from said oscillator in accordance with signals which it is desired to transmit, a control for simulating the selection of an intermediate amplifier range, a control for simulating the selection of a double range, a control for simulating the selection of a master oscillator range, a master oscillator tuning control, a doubler tuning simulation control, an intermediate amplifier tuning simulation control, oppositely phased sources of alternating current, means controlled by said controls for deriving potentials from one of said sources commensurate with the tuning effects of said controls, a power amplifier tuning simulation control, antenna tuning simulation controls, means controlled by said latter controls for deriving potentials from the other of said sources commensurate with the tuning effects of said latter controls, meters, and electronic devices responsive respectively to the summations of different ones of said derived potentials for selectively controlling said meters whereby said meters are operated in simulation of the usual operation of the corresponding meters of an actual radio transmitter in response to the tuning of said actual radio transmitter.

23. In a device for simulating a radio transmitter, a master oscillator for generating a carrier frequency, means for controlling the emission from said oscillator in accordance with signals which it is desired to transmit, a control for simulating the selection of an intermediate amplifier range, a control for simulating the selection of a doubler range, a control for simulating the selection of a master oscillator range, other tuning simulation controls, a source of current, a first, a second and a third potential divider energizable from said source, means controlled by said intermediate amplifier range control for deriving a potential from said first potential divider commensurate with the setting of said control, means jointly controlled by said intermediate amplifier and said doubler range controls for deriving a potential from said second potential divider commensurate with the settings of said controls, means jointly controlled by said intermediate amplifier and said master oscillator range controls for deriving a potential from said third potential divider commensurate with the settings of said controls, means controlled by said other controls for deriving potentials from said source commensurate with the tuning effects of said controls, meters, and electronic devices responsive respectively to the summations of different ones of said derived potentials for selectively controlling said meters whereby said meters are operated in simulation of the usual operation of the corresponding meters of an actual radio transmitter in response to the tuning of said actual radio transmitter.

24. In a device for simulating a radio transmitter, a master oscillator for generating a carrier frequency, means for controlling the emission from said oscillator in accordance with signals which is is desired to transmit, a control for simulating the selection of an intermediate amplifier range, a control for simulating the selection of a doubler range, a control for simulating the selection of a master oscillator range, other tuning simulation controls, a source of current, a first, a second and a third potential divider energizable from said source of current, relays selectively operable by said intermediate amplifier range control, means controlled by said relays for deriving a potential from said first potential divider commensurate with the setting of said intermediate amplifier range control, means controlled by said relays for varying the total resistance of each of said other potential dividers, means controlled by said doubler range control for deriving a potential from said second potential divider commensurate with the setting of said control, means controlled by said master oscillator range control for deriving a potential from said third potential divider commensurate with the setting of said control, means controlled by said other controls for deriving potentials from said source commensurate with the tuning effects of said other controls, meters, and electronic devices responsive respectively to the summations of different ones of said derived potentials for selectively controlling said meters whereby said meters are operated in simulation of the usual operation of the corresponding meters of an actual radio transmitter in response to the tuning of said actual radio transmitter.

25. In a device for simulating a radio transmitter, an oscillator for generating a carrier frequency, means for controlling the emission from said oscillator in accordance with signals which it is desired to transmit, means for simulating the connection of an antenna to the radio frequency output of an actual transmitter, tuning controls for tuning the oscillator, other tuning simulation controls, a source of current, means controlled by said tuning controls for deriving potentials from said source commensurate with the tuning effects of said controls, a meter, electronic devices responsive respectively to the summations of different ones of said potentials for selectively controlling said meter, and a relay operable only if said simulated antenna has been connected to cause said meter to be responsive to said electronic devices in a manner to show a reading in simulation of the usual operation of the corresponding antenna current meter of said actual radio transmitter in response to the tuning of said actual radio transmitter.

26. In a device for simulating a radio transmitter, an oscillator for generating a carrier frequency, means for controlling the emission from said oscillator in accordance with signals which it is desired to transmit, means for simulating the connection of an antenna to the radio frequency output terminal of an actual transmitter, tuning controls for tuning the oscillator, tuning controls for simulating the tuning of the intermediate and power amplifier stages of an actual transmitter, controls for simulating the variation of the capacitance, inductance and coupling of the antenna, a source of current, means controlled by said controls for deriving potentials from said source commensurate with the tuning effects of said controls, a simulated power amplifier plate current meter, electronic devices responsive to the summation of said potentials for controlling said meter, and a relay operable only if said simulated antenna has been connected to render said antenna capacitance, antenna inductance and antenna coupling controls effective to apply derived potentials to said electronic devices for controlling said meter in simulation of the usual operation of the corresponding meter of said actual radio transmitter in response to the tuning of said actual radio transmitter.

27. In a device for simulating a radio transmitter, an oscillator for generating a carrier frequency, means for controlling the emission from said oscillator in accordance with signals which it is desired to transmit, tuning controls for tuning the oscillator, other tuning simulation controls, a switch having a voltage and a current position, a source of current, means controlled by said controls for deriving potentials from said source commensurate with the tuning effects of said controls, a simulated antenna current meter, electronic devices responsive to the summation of said potentials for controlling said meter, and means controlled by said switch for rendering said meter unresponsive to said electronic devices unless said switch is operated into its current position.

ARTHUR LUDWIG.

REFERENCES CITED

The following references are of record in the file of this patent:

UNITED STATES PATENTS

| Number | Name | Date |
|---|---|---|
| 2,010,833 | Willoughy | Aug. 13, 1935 |
| 2,110,869 | Crane | Mar. 15, 1938 |
| 2,321,799 | Cone | June 15, 1943 |
| 2,359,294 | Blenman | Oct. 3, 1944 |
| 2,366,603 | Dehmel | Jan. 2, 1945 |
| 2,458,550 | Baulch | Jan. 11, 1949 |